(12) United States Patent
Swenson et al.

(10) Patent No.: US 7,378,337 B2
(45) Date of Patent: *May 27, 2008

(54) LASER-BASED TERMINATION OF MINIATURE PASSIVE ELECTRONIC COMPONENTS

(75) Inventors: Edward J. Swenson, Portland, OR (US); Douglas J. Garcia, Beaverton, OR (US); Bruce Stuart Goldwater, Lake Oswego, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 175 days.

This patent is subject to a terminal disclaimer.

(21) Appl. No.: 11/437,117

(22) Filed: May 18, 2006

(65) Prior Publication Data

US 2006/0216955 A1 Sep. 28, 2006

Related U.S. Application Data

(63) Continuation-in-part of application No. 10/982,316, filed on Nov. 4, 2004, now Pat. No. 7,053,011.

(60) Provisional application No. 60/518,378, filed on Nov. 4, 2003.

(51) Int. Cl.
*H01L 21/4763* (2006.01)

(52) U.S. Cl. .................................... 438/618

(58) Field of Classification Search ............ 438/460, 438/462, 465, 476, 496, 800, 618
See application file for complete search history.

(56) References Cited

U.S. PATENT DOCUMENTS

| 4,928,254 | A | 5/1990 | Knudsen et al. ............ 702/136 |
|---|---|---|---|
| 5,753,299 | A | 5/1998 | Garcia et al. ................. 427/96 |
| 5,863,331 | A | 1/1999 | Braden et al. .............. 118/261 |
| 5,923,077 | A | 7/1999 | Chase et al. ................. 257/536 |
| 6,541,271 | B1 * | 4/2003 | McFarland et al. ........... 506/12 |
| 6,555,447 | B2 | 4/2003 | Weishauss et al. .......... 438/460 |
| 7,053,011 | B2 * | 5/2006 | Swenson et al. ............ 438/800 |
| 2003/0231457 | A1 | 12/2003 | Ritter et al. ............. 361/306.3 |
| 2004/0090732 | A1 | 5/2004 | Ritter et al. ............. 361/306.1 |
| 2004/0257748 | A1 | 12/2004 | Ritter et al. ............. 361/306.3 |

FOREIGN PATENT DOCUMENTS

WO WO 2005/045521 A2 5/2005

\* cited by examiner

*Primary Examiner*—Phuc T Dang
(74) *Attorney, Agent, or Firm*—Stoel Rives LLP

(57) ABSTRACT

Terminating the ends of passive electronic components entails applying a laser-removable coating to one or both of the opposed major surfaces of a substrate. A UV laser beam having a spot size and an energy distribution sufficient to remove the laser-removable coating from multiple selected regions of at least one of the major surfaces to which the laser-removable coating was applied is directed for incidence on the substrate. Relative motion between the UV laser beam and substrate effects removal of sufficient amounts of laser-removable coating to expose the multiple selected regions. The substrate is then broken into multiple rowbars or individual components, each of which includes side margins. An electrically conductive material is applied to the side margins to form electrically conductive interconnects between portions of the side margins spatially aligned with the multiple selected regions.

18 Claims, 18 Drawing Sheets

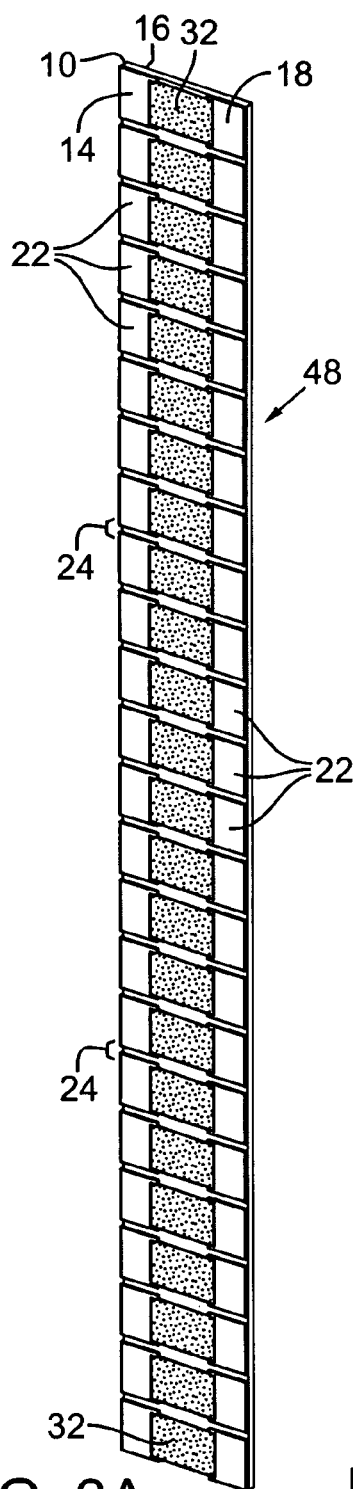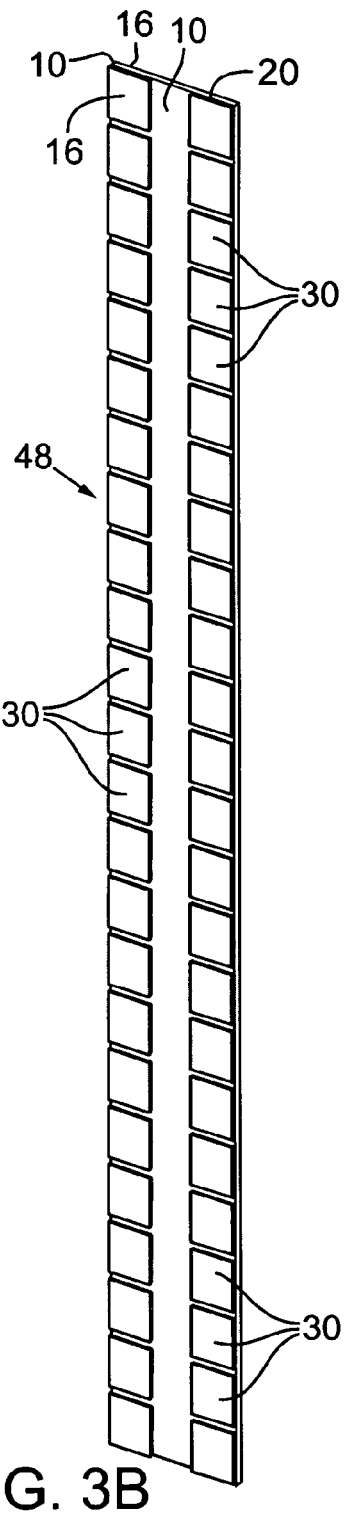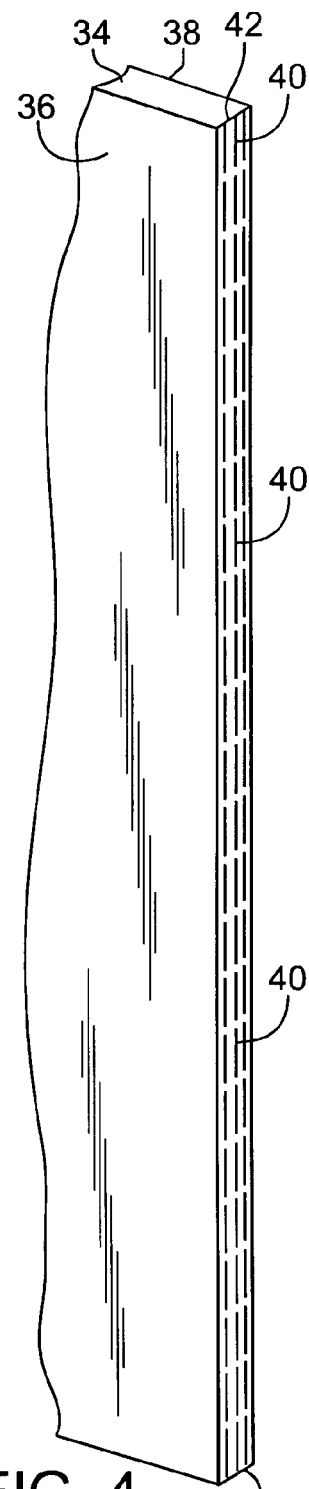
FIG. 3A (Prior Art)
FIG. 3B (Prior Art)
FIG. 4 (Prior Art)

US 7,378,337 B2

LASER-BASED TERMINATION OF MINIATURE PASSIVE ELECTRONIC COMPONENTS

RELATED APPLICATIONS

This application is a continuation-in-part of U.S. patent application Ser. No. 10/982,316, filed Nov. 4, 2004, now U.S. Pat. 7,053,011 which claims the benefit of U.S. Provisional Patent Application No. 60/518,378, filed Nov. 4, 2003.

TECHNICAL FIELD

The present invention relates to the efficient and accurate formation of passive electronic components, and more particularly to a method of accurately terminating the ends of next-generation, miniature passive electronic components.

BACKGROUND OF THE INVENTION

Miniature passive electronic circuit components are conventionally fabricated in an array on a substrate. Exemplary types of passive electronic components of interest with regard to the present invention are resistors and capacitors. FIGS. 1A and 1B show an array of resistors in which a substrate 10 includes a first (or upper) major surface 14 and a second (or lower) major surface 16 carrying, respectively, first spaced-apart segmented electrical conductor lines 18 and second spaced-apart segmented electrical conductor lines 20 (end portions of which shown in dashed lines in FIG. 1B). Segmented conductor lines 18 are in parallel alignment, and segmented conductor lines 20 are in parallel alignment.

Each segmented conductor line 18 is composed of multiple electrode pads 22, adjacent ones of which are separated from each other by a small distance 24 and all of which are aligned along first major surface 14. Except for the two terminal end segmented conductor lines 18, each segmented conductor line 18 is positioned between two neighboring segmented conductor lines 18 and is separated from one of them by a relatively wide space 26 and from the other of them by a relatively narrow space or street 28u. Similarly, each segmented conductor line 20 is composed of multiple electrode pads 30, adjacent ones of which are separated from each other by a small distance 24 and all of which are aligned along second major surface 16. Except for the two terminal end segmented conductor lines 20, each segmented conductor line 20 is positioned between two neighboring segmented conductor lines 20 and is separated from one of them by a relatively wide space 26 and from the other one of them by a street 28l.

The electrical conductor lines are also arranged in spatially aligned pairs of one electrical conductor line 18 on first major surface 14 and one electrical conductor line 20 on second major surface 16. First major surface 14 further includes multiple regions of resistive material 32 positioned in spaces 26 between electrode pads 22 of adjacent electrical conductor lines 18, as shown in FIGS. 1A and 1B. Second major surface 16 may also include electrode pads 30 of or continuous electrical conductor lines 20.

FIGS. 2 and 4 show a substrate of dielectric material 34 that is used in the fabrication of one type of prior art capacitors. Substrate 34 includes a first (or upper) major surface 36 and a second (or lower) major surface 38 between which multiple spaced-apart sheet electrodes 40 are internally stacked in plane parallel arrangement. FIG. 4 shows exposed side margins 42 of internal electrodes 40. There is no electrical conductor line formed on either of major surfaces 36 and 38 of this type of capacitor.

Substrates 10 and 34 are cut, sometimes called diced, to singulate the passive electronic components. FIGS. 3A and 3B show first and second major surfaces 14 and 16, respectively, of substrate 10 after it has been broken apart to form multiple rowbars 48 of resistors. Rowbars 48 are then cut into separate chip resistors 52 (shown in FIG. 5). Capacitors 54 (shown in FIG. 6) are formed by dicing substrate 34 without formation of rowbars. Each chip resistor 52 includes an electrically conductive interconnect 56 that extends between electrical conductor lines 18 and 20 in each spatially aligned pair of them. Capacitor 54 includes an electrically conductive interconnect 58 that bridges across side margins 42 of internal electrodes 40. Conductive interconnects 56 are formed by applying a metal coating (e.g., a silver paste) to a side margin portion 60 of resistor substrate 10. Great precision is needed when forming conductive interconnects 56 and 58 to ensure that none of the metal coating extends across a region of resistive material 32 or connects both conductive interconnects 58 across first or second major surfaces 36 and 38, and thereby forms an electrically conductive bridge that would cause the resulting chip resistor 52 or capacitor 54 to become a short circuit.

Most prior art methods of forming conductive interconnects 56 between spatially aligned pairs of electrical conductor lines 18 and 20 entail applying a resist coating that covers and protects regions of resistive material 32 defined by spaces 26 between electrode pads 22 on major surface 14 while the metal coating is applied. However, recent technological advancements in component miniaturization have resulted in the formation of chip resistors 52 having respective length and width dimensions of about 0.6 mm×0.3 mm (0201 chip resistors) and a thickness of between about 90 microns and about 150 microns, as compared to prior art 0402 chip resistors having respective length and width dimensions of about 1.0 mm×0.5 mm. The small sizes of chip resistors 52 make accurate and efficient application of the resist coating exceedingly difficult to achieve. Consequently, chip manufacturers have begun to form conductive interconnects 56 on rowbars 48 rather than on discrete chip resistors 52 because rowbars 48 are significantly larger in size (typically having respective length and width dimensions of between about 36 mm and about 80 mm and between about 3.2 mm and about 0.6 mm) and are thus easier to handle during processing.

One prior art method of forming conductive interconnects 56 on chip resistors 52 entails cutting substrate 10 into multiple rowbars 48 and then dipping side margins 60 of each rowbar 48 into the metal coating. However, accurate application of the metal coating by dipping becomes virtually impossible as the size of rowbar 48 and chip resistor 52 decreases. Consequently, the metal coating bridges regions of resistive material 32 and causes the resulting chip resistor 52 to become a short circuit.

A second prior art method of forming conductive interconnects 56 on chip resistors 52, described in U.S. Pat. No. 5,753,299 to Garcia et al., entails screen printing the resist coating onto rowbars 48 so that the resist coating covers only selected regions of resistive material 32. The resist material-coated rowbars 48 are then sputter-coated with the metal coating to form conductive interconnects 56. Lastly, the resist coating is removed from rowbars 48 to expose regions of resistive material 32, and rowbar 48 is cut to form multiple individual chip resistors 52. Screen printing is a mechanical process and thus has inherent size limitations that have been reached. Specifically, screen printing is becoming ineffective to form next-generation, miniature chip resistors because this method cannot provide sufficient electrical conductor line straightness or accuracy. Further, screen printing results in the formation of nonuniform lines, and the resulting ragged edges predominate in the next-generation, miniature chip resistors.

A third prior art method of forming conductive interconnects 56 entails assembling numerous rowbars 48 face-to-face in a tight stack to form a fixture that is then sprayed with the metal coating. The uppermost and lowermost (terminal) rowbars 48 in the fixture are sacrificed because regions of resistive material 32 on these terminal rowbars 48 are oversprayed with the metal coating. Conductive interconnects 56 are, however, formed on the other stacked rowbars 48. Lastly, each rowbar 48 is cut to form multiple chip resistors 52.

Regarding terminating the ends of capacitors, conventional termination systems terminate the ends when they are in singulated, discrete capacitor form. More specifically, the most common prior art method of forming conductive interconnect 58 on unterminated capacitors entails holding a discrete, unterminated capacitor by its end and dipping it into a viscous termination paste. Once the paste has dried, the discrete, partly terminated capacitor is repositioned for dipping the opposite end into the viscous termination paste. Accurate application of the termination paste by dipping becomes virtually impossible as the sizes of capacitors 54 decrease. Consequently, a metal coating bridging both conductive interconnects 58 would cause the resulting nominal capacitor 54 to become a short circuit.

Because they are approaching their physical limits, all of the prior art methods are inadequate for accurately terminating the ends of next-generation, miniature passive electronic components, including chip resistors and capacitors. Consequently, a need has arisen for a highly efficient and accurate method of terminating next-generation, miniature passive electronic components.

SUMMARY OF THE INVENTION

An object of the present invention is, therefore, to provide a method of forming conductive interconnects between electrically conductive regions of passive electronic components to terminate their ends.

A preferred method of the present invention entails applying a laser-removable coating, preferably a laser-ablating, nonphotosensitive coating, to each of first (upper) and second (lower) major surfaces of a substrate. The first and second major surfaces support respective first and second mutually spaced-apart electrical conductor lines arranged lengthwise in spatially aligned different pairs of one first electrical conductor line and one second electrical conductor line. A UV laser beam having a spot size and an energy distribution sufficient to remove the laser-ablative coating from selected regions of the first and second major surfaces is aligned with and directed for incidence on the substrate. The UV laser beam and substrate move relative to each other to remove sufficient amounts of the laser-ablative coating and thereby expose at least a portion of the lengths of the first and second electrical conductor lines. The substrate is then broken into multiple rowbars, each of which includes side margins along which run different spatially aligned pairs of first and second electrical conductor lines. An electrically conductive coating material is applied to the side margins of the rowbars to form electrically conductive interconnects between each spatially aligned pair of electrical conductor lines.

Certain types of substrates do not support electrical conductor lines on one or both of the first (upper) and second (lower) major surfaces, thereby leaving it or them vacant. To practice the method on such substrates for resistors, the UV laser beam removes amounts of laser-ablative coating from the second major surface to expose the vacant locations where electrical conductor lines would have been supported to form the previously described spatially aligned pairs. Upon formation of the rowbars, the electrically conductive coating material is applied to form electrical conductor lines in the exposed vacant locations and to the rowbar side margins to interconnect the newly formed electrical conductor lines on the second major surface and the previously existing electrical conductor lines on the first major surface.

To practice the method on substrates having vacant electrical conductor line locations on one or both of the first and second major surfaces for use in capacitors, the UV laser beam removes amounts of laser-ablative coating from one or both of the first and second major surfaces to expose thin stripes of dielectric material where electrically conductive regions are to be formed. Upon formation of the rowbars, the electrically conductive coating material is applied to bridge across and thereby connect the side margins of the internal electrodes and bond to the exposed dielectric material on the first major surface, the second major surface, or both of them.

Certain types of substrates for capacitors, such as surface-mount capacitors, support spaced-apart electrical conductor lines on the second major surfaces and no electrical conductor lines on the first major surfaces. To practice the method on substrates for surface-mount capacitors, the laser removes amounts of laser-ablative coating from the second major surface to expose the electrical conductor lines and does not process the laser-ablative coating on the first major surface. Alternative processing of a substrate for surface-mount capacitors entails applying no laser-ablative coating on the first major surface and applying a laser-ablative coating on and removing amounts of the laser ablative coating from the second major surface. Upon formation of rowbars or singulation of the surface-mount capacitors, the electrically conducting coating material is applied to bridge across and thereby interconnect the side margins of the internal electrodes and the electrical conductor lines on the second major surface. These methods carried out on a substrate not supporting electrical conductor lines on one or both of its surfaces can also be applied to other passive electronic components, including chip inductors and varistors.

A preferred option of the method includes removing from the rowbars residual amounts of the laser-ablative coating following formation of the conductive interconnects.

Although use of a UV laser beam to remove the laser-ablative coating is preferred, the method can be practiced using lasers emitting different wavelengths of light to remove amounts of a different, wavelength compatible laser-removable coating.

In a first preferred embodiment, the substrate includes ceramic material and supports a region of resistive material, and the type of passive electronic component formed is a resistor.

In a second preferred embodiment, the substrate includes dielectric material, and the type of passive electronic component formed is a capacitor.

Preferred implementations of the method entail forming multiple scribe lines in one or both of the major surfaces of the substrate. Each scribe line is positioned in an area called a "street," which lies between and runs generally parallel or perpendicular to the lengths of adjacent electrical conductor lines. A breakage force applied to either side of the scribe line effects clean breakage of the substrate into separate passive electronic components having side margins defined by the scribe line. The scribe line is preferably formed by directing a UV laser beam along the substrate such that a portion of the thickness of the substrate is removed to form a shallow trench. The trench has a diminishing width that converges from the substrate surface to the bottom of the trench to define a sharp snap line. The UV laser beam is characterized by an energy distribution and a spot size sufficient to form the scribe line in the absence of appreciable substrate melting, so that the clearly defined, sharp snap line forms a region of high stress concentration extending into the thickness of the substrate and along the length of the snap line. Consequently, multiple depthwise fractures propagate into the thickness of the substrate in the region of high stress concentration in response to a breakage force applied to either side of the trench to effect clean breakage of the substrate into separate circuit components having side margins defined by the snap line.

Use of a UV laser to ablate the laser-ablative coating and to form a scribe line is preferred because switching between the two UV laser processing operations entails only introducing beam shaping optics and beam power adjustment. A laser beam of Gaussian shape is used to form scribe lines, and a laser beam of uniform shape formed by inserting a beam shaping objective lens is used to ablate the laser-ablative coating.

Additional aspects and advantages of this invention will be apparent from the following detailed description of preferred embodiments, which proceeds with reference to the accompanying drawings.

BRIEF DESCRIPTION OF THE DRAWINGS

FIGS. 3A and 3B are respective isometric views of front-side and rear-side major surfaces of a prior art rowbar formed by breaking the substrate plate of FIGS. 1A and 1B in a vertical direction between adjacent electrical conductor lines.

FIG. 4 is a fragmentary isometric view showing a side margin of the substrate plate of FIG. 2 as seen from either one of the front-side or rear-side major surfaces of the substrate plate.

DETAILED DESCRIPTION OF PREFERRED EMBODIMENTS

Figure 1A:
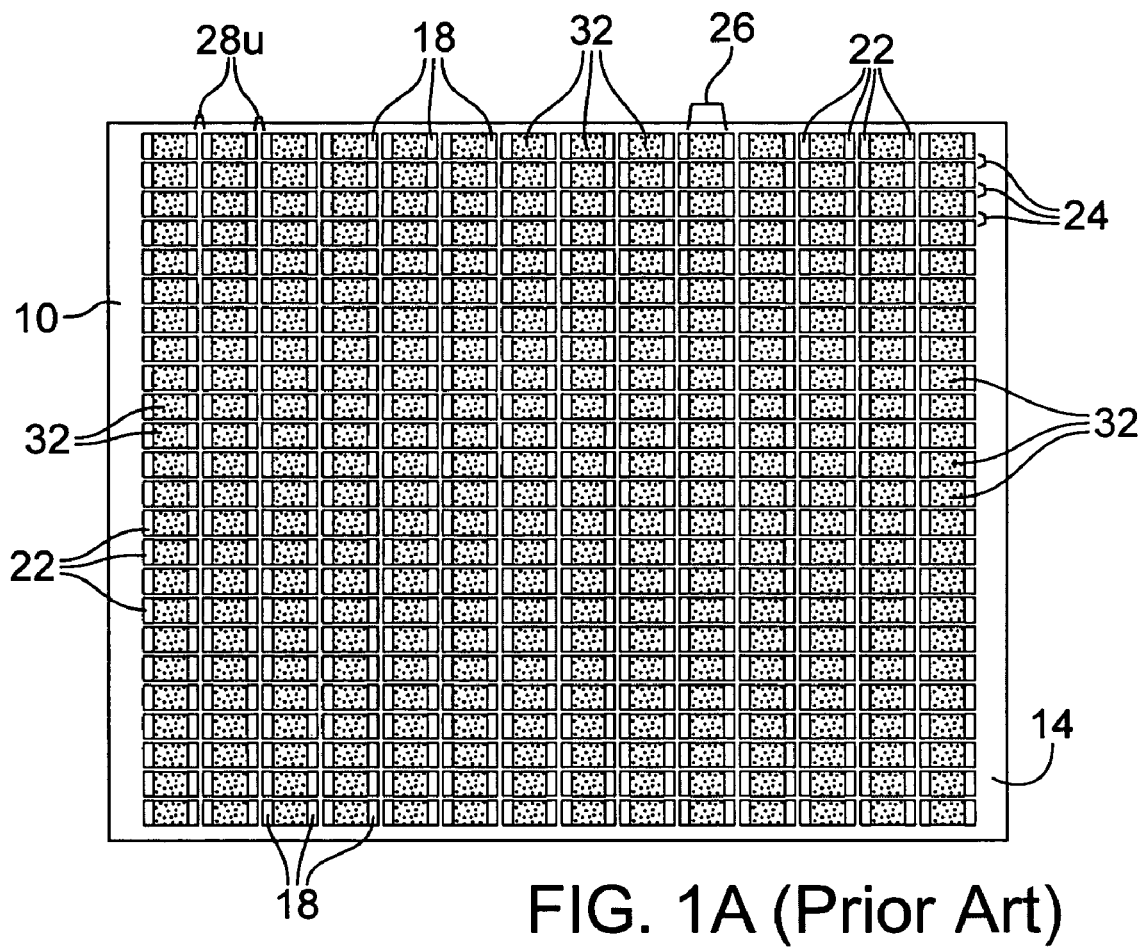
FIG. 1A is a plan view of a prior art substrate plate carrying an array of regions of resistive material positioned between adjacent electrical conductor lines such that, when diced and terminated, multiple discrete chip resistors are formed.
Figure 1B:
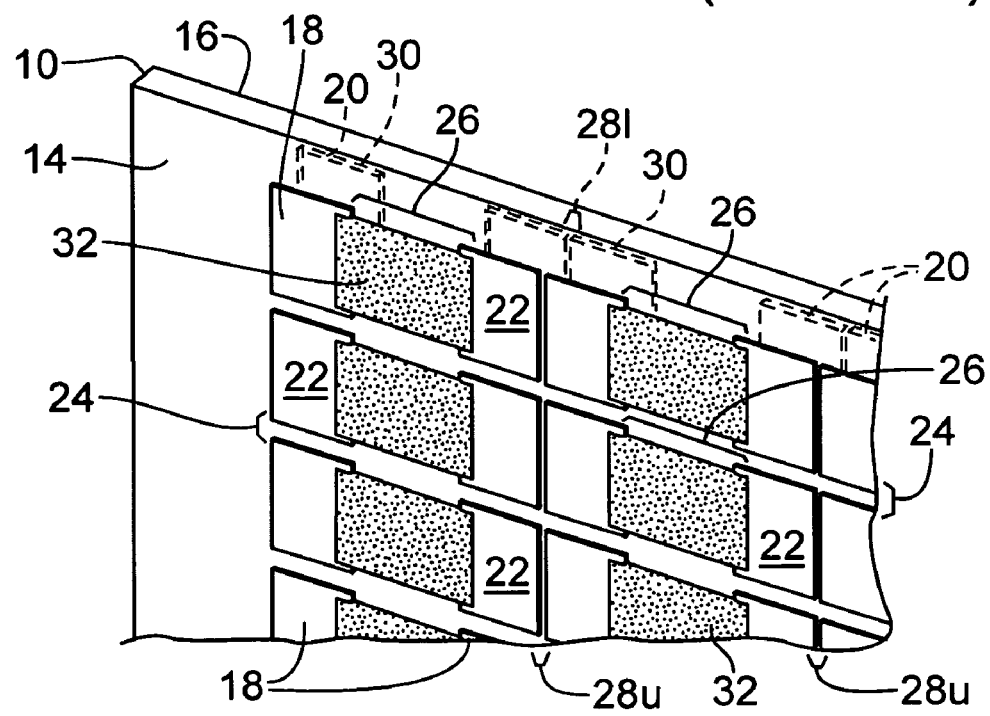
FIG. 1B is an enlarged fragmentary isometric view of several regions of resistive material positioned between adjacent electrical conductor lines located in the upper left-hand corner of the prior art substrate plate of FIG. 1A.
Figure 2:
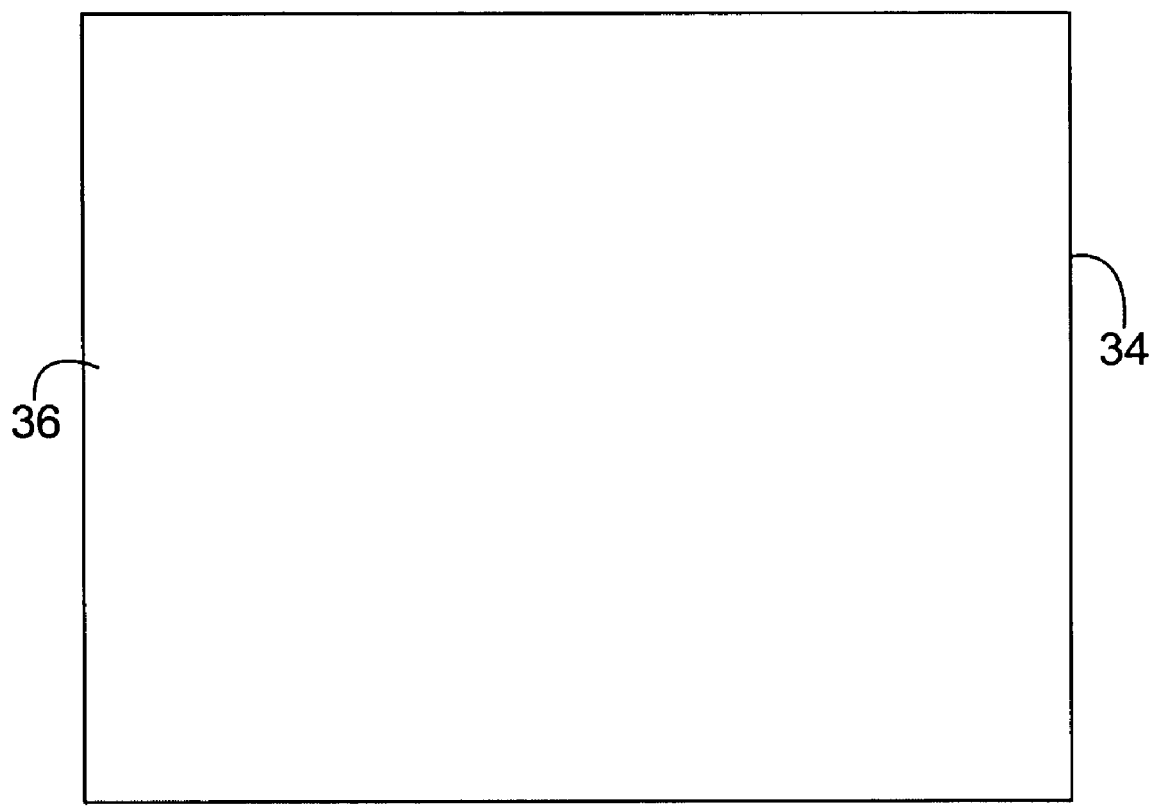
FIG. 2 is a plan view of a prior art substrate plate that, when diced and terminated, forms multiple discrete capacitors.
Figure 5:
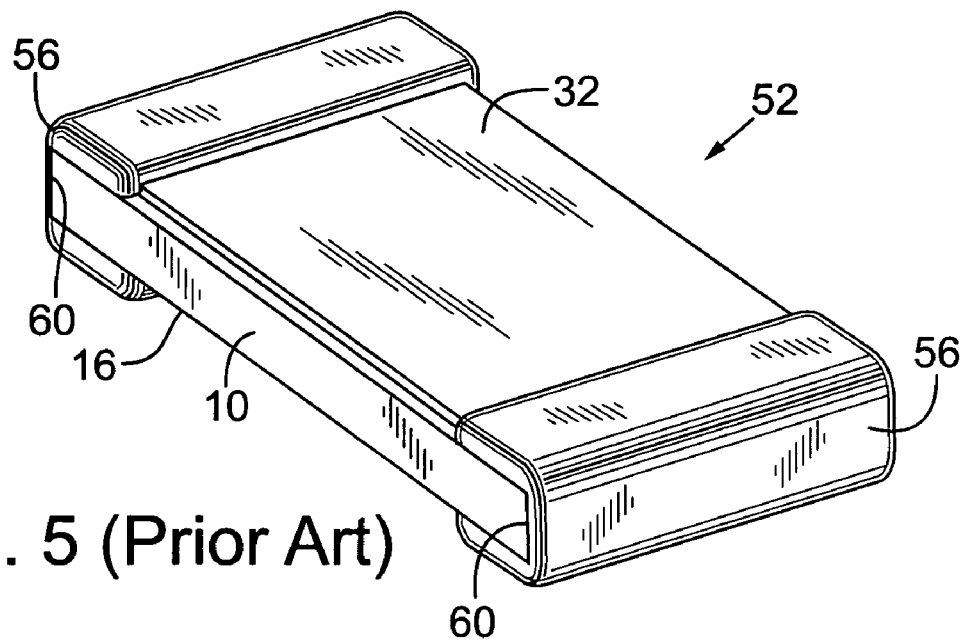
FIG. 5 is an isometric view of one of multiple prior art resistors formed by dicing and terminating the rowbar of FIGS. 3A and 3B into separate, discrete resistors.
Figure 6:
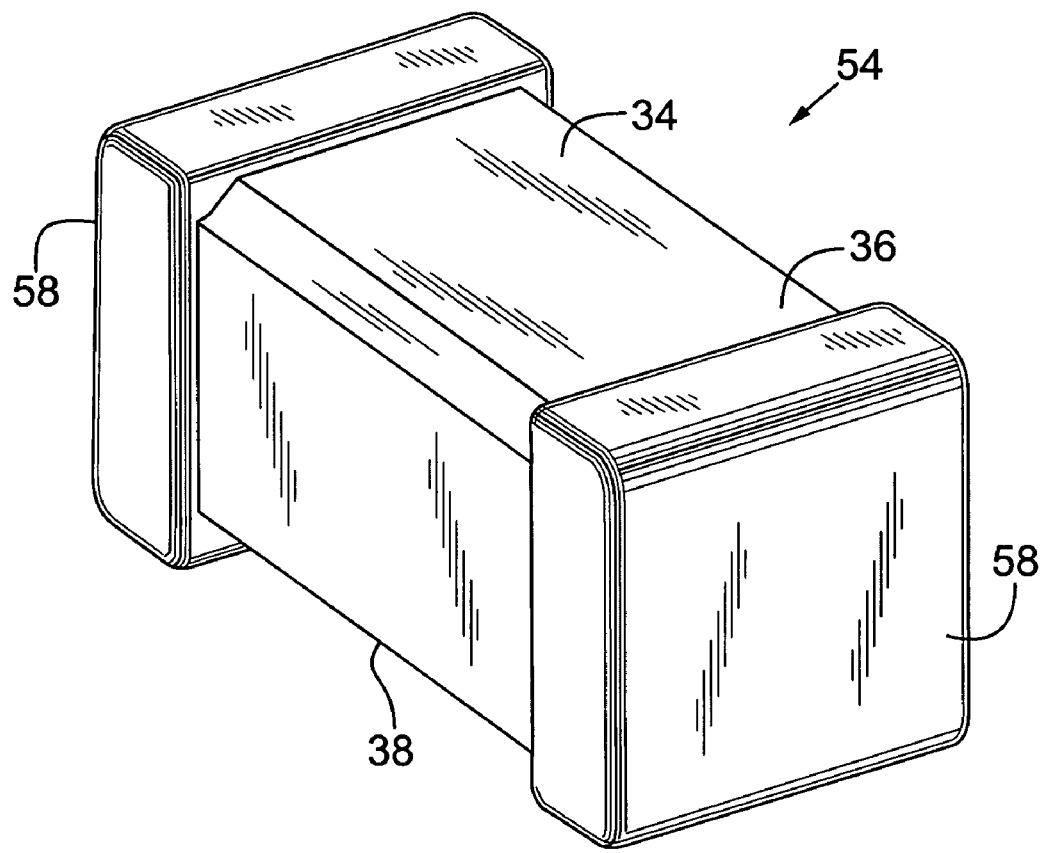
FIG. 6 is an isometric view of one of multiple prior art capacitors formed by dicing and terminating the rowbar of FIG. 4 into separate, discrete capacitors.

As discussed above, prior art methods of forming a conductive interconnect between each electrical conductor in a spatially aligned pair of electrical conductors entailed successively applying to a rowbar a resist coating and then a metal coating. However, these prior art methods are quickly becoming inadequate in light of technological advancements that have led to the formation and use of miniature, next-generation passive electronic components.

A preferred method of the present invention, in contrast, entails applying a laser-ablative coating to the substrate while it is in plate form, directing a uniform-shaped laser beam emitted by a UV laser along the lengths of the electrical conductor lines to remove the laser-ablative coating in sufficient amounts to expose them, breaking the substrate plate into multiple rowbars having exposed side margins, and metallizing the side margins of the rowbars to form conductive interconnects. Because a laser-ablative coating is applied while the electronic circuit components are in their larger-sized substrate plate form, greater accuracy and efficiency can be achieved than when attempting to apply the resist coating to the smaller-sized rowbar form in accordance with prior art techniques. A UV laser is preferred because organic materials, of which the laser-ablative coating is made, are cleanly ablated by UV wavelengths of laser radiation.

Preferred methods of the present invention may be used to terminate the ends of various passive electronic components. The term "substrate" used in connection with passive electronic components herein refers to single layer structures as well as consolidated stack, multi-layer, and laminated multi-layer structures. Passive electronic component substrates are of different types including, but not limited to, preferred ceramic and ceramic-like materials described below.

A first type is a ceramic substrate constructed in either single layer or multi-layer plate form including green (soft) or fired (hard) plates of, for example, high temperature co-fired ceramic (HTCC) or low temperature co-fired ceramic (LTCC) materials.

A second type is a single layer fired ceramic substrate patterned with individual (chip) resistors, or resistor networks; piezoelectric, electro-optic, or opto-electronic devices; inductors; or other individual components built on the larger multi-element ceramic substrate.

A third type is implemented with multi-layer ceramic technology, including, for either HTCC or LTCC materials, chip capacitors, networks composed of arrays of multiple component types (e.g., resistors, capacitors, and inductors), and HTCC and LTCC electronic packages containing passive components or electronic packages for use as interposers connecting semiconductor (e.g., silicon) devices to other electronic packages.

A fourth type is a specialized ceramic substrate, either fired or unfired, and of either single layer or multi-layer construction, such as, for example, a substrate of a varistor or a thermistor. Single layer construction of thermistor and varistor substrates is referred by skilled persons to any one of discs, rods, washers, slabs, plates, tubular shapes, and beads.

Exemplary preferred methods of the present invention will be described first with reference to the formation of discrete chip resistors and then with reference to the formation of discrete chip capacitors.

Figure 7:
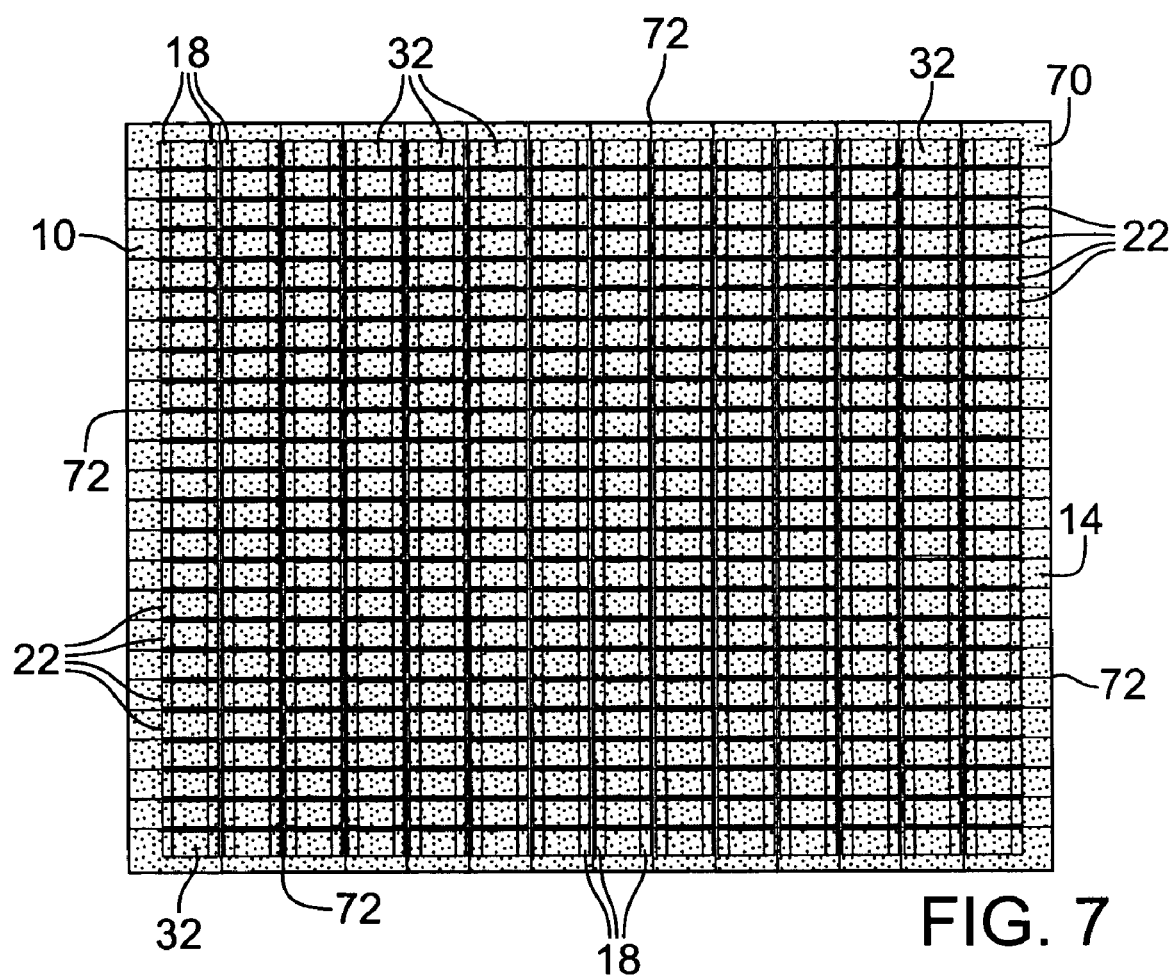
FIG. 7 is a plan view of a prescribed substrate plate of the type shown in FIGS. 1A and 1B in which the major surface carrying resistive material is covered with a laser-ablative coating.

With respect to the formation of chip resistors 52, a preferred method of the present invention entails applying a laser-ablative coating 70 to each of first major surface 14 and second major surface 16 of substrate 10, as shown in FIG. 7 for major surface 14. Substrate 10 is preferably a ceramic material but could be an alternative material having the appropriate electrical and mechanical properties. A preferred laser-ablative coating 70 is a nonphotosensitive, laser-ablative resist, which is an organic material. Laser-ablative coating 70 can, but need not be, a polyimide; it can be any laser-ablative resist material that is compatible with the chosen substrate 10. Laser-ablative coating 70 preferably entirely covers each of first and second major surfaces 14 and 16 of substrate 10.

Figure 8A:
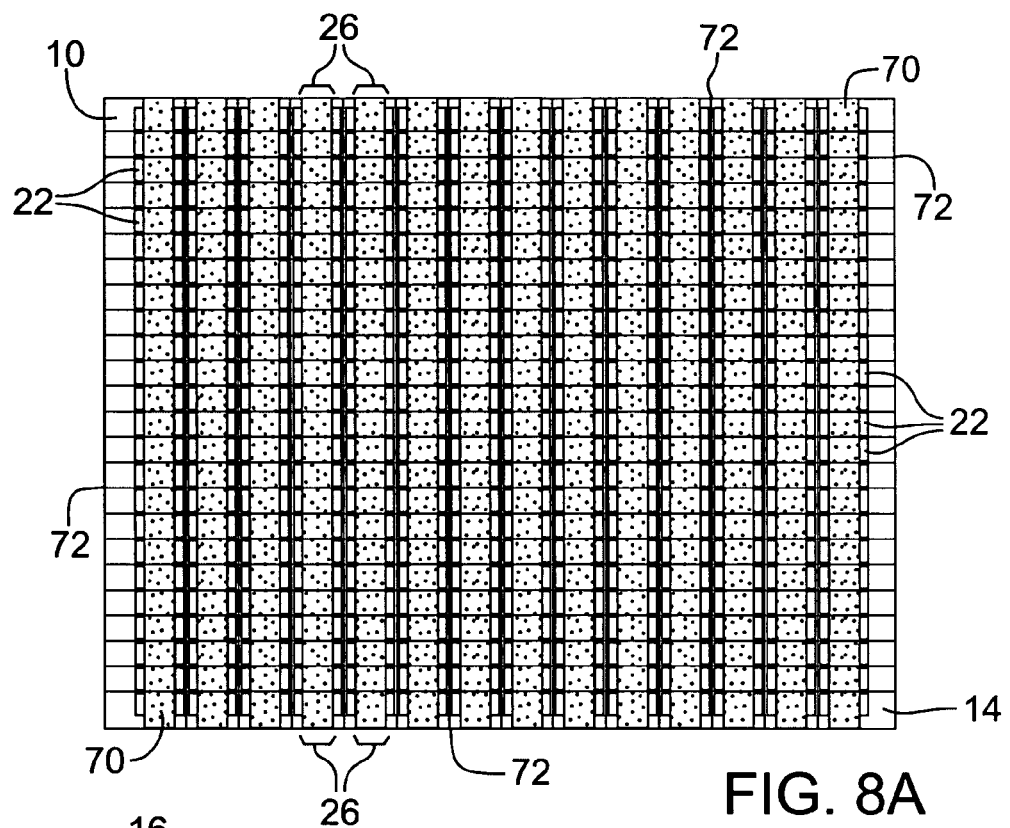
FIG. 8A is a plan view of the resistive material-carrying upper major surface of the substrate plate of FIG. 7 after exposure of laser ablative material-coated electrical conductor lines to UV laser output.
Figure 8B:
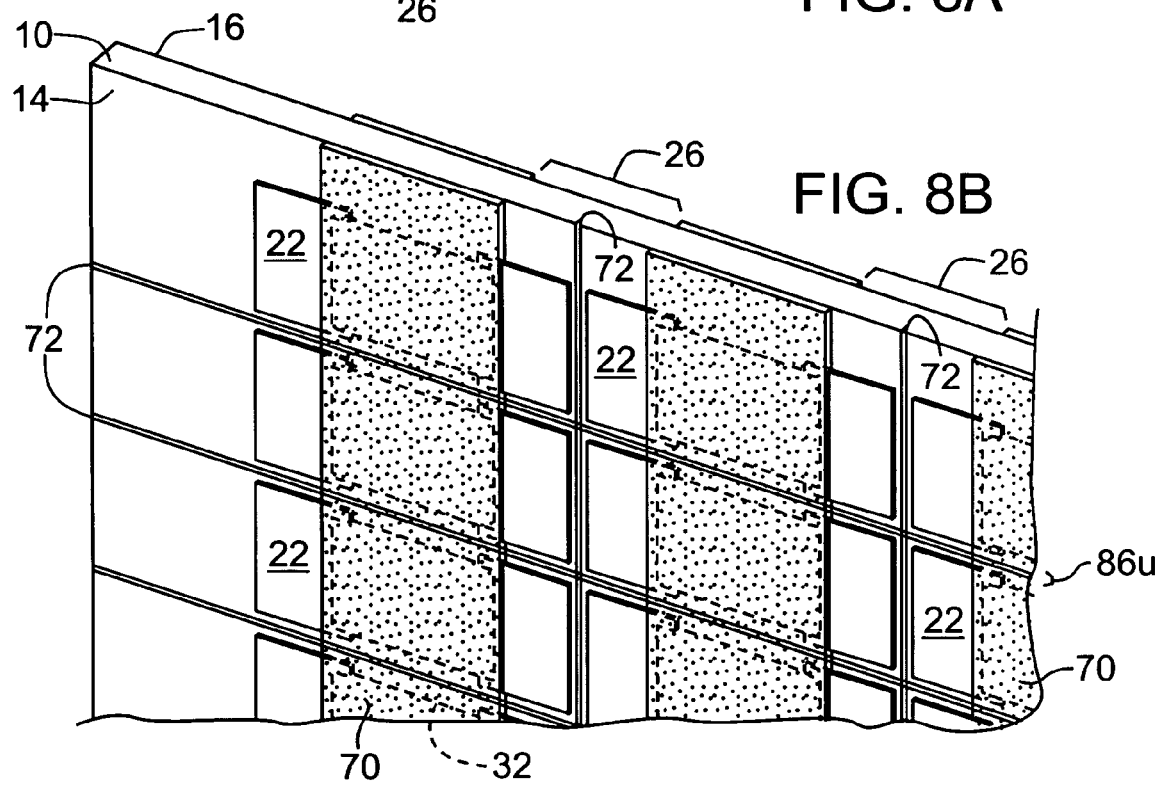
FIG. 8B is an enlarged fragmentary isometric view of the exposed portions of the electrically conductive lines located in the upper left-hand corner of the substrate plate of FIG. 8A.
Figure 8C:
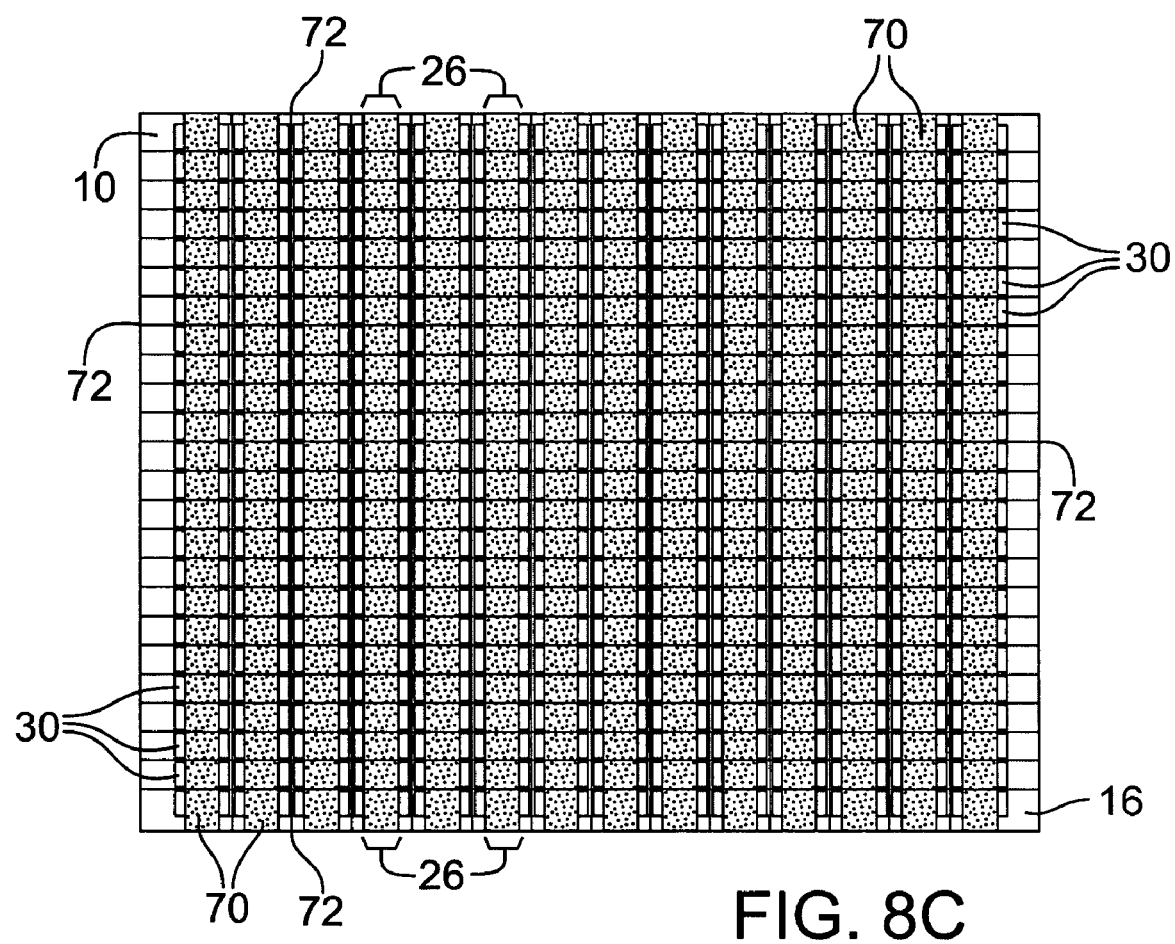
FIG. 8C is a plan view of the lower major surface of the substrate plate of FIG. 7 after exposure of laser ablative material-coated electrical conductor lines to UV laser output.

Next, a UV laser beam having a spot size and an energy distribution sufficient to remove the laser-ablative coating from selected regions of first and second major surfaces 14 and 16 is aligned and directed for incidence on substrate 10. The UV laser beam is directed along at least a portion of the length of each of electrical conductor lines 18 and 20 that form a spatially aligned pair, thereby removing sufficient amounts of laser-ablative coating 70 to expose at least a portion of the length of each of first and second conductor lines 18 and 20, as is shown in FIGS. 8A, 8B, and 8C. FIGS. 8A and 8B show laser-ablative coating 70 remaining on regions of resistive material 32 and small portions of electrode pads 22 on first major surface 14 of substrate plate 10. FIG. 8C shows laser-ablative coating 70 remaining on regions defined by spaces 26 between electrode pads 30 on second major surface 16. Removal of laser-ablative coating 70 from at least a portion of first and second major surfaces 14 and 16 may be performed simultaneously or successively from one and then the other of first and second major surfaces 14 and 16.

A preferred UV laser emits a uniform-shaped laser beam having a wavelength of less than 400 nm, more preferably 355 nm, 266 nm, or 213 nm. (A UV laser is defined as one that emits light having a wavelength shorter than 400 nm.) A preferred laser for use in the method of the present invention is a Q-switched, diode-pumped, solid-state UV laser that includes a solid-state lasant, such as Nd:YAG, Nd:YLF, Nd:YAP, or Nd:YVO4, or a YAG crystal doped with holmium or erbium. UV lasers are preferred because most laser-removable resist coatings exhibit strong absorption in the UV range; however, any laser source that generates a laser beam having a wavelength that cleanly removes organic materials may be used. A preferred laser provides harmonically generated UV laser output of one or more laser pulses at a wavelength such as 355 nm (frequency tripled Nd:YAG), 266 nm (frequency quadrupled Nd:YAG), or 213 nm (frequency quintupled Nd:YAG) with primarily a TEM00 spatial mode profile. Laser output having a wavelength of 355 nm is especially preferred because the higher damage threshold characteristics of the second and third harmonic crystals used in, respectively, frequency doubling and frequency tripling allow for the greatest available power and pulse repetition rate. The laser preferably has a round or square uniform beam, the bottom area of which has a diameter or side length of between about 30 microns and about 300 microns. The laser is preferably operated at a high repetition rate of between about 15 kHz and about 100 kHz and a power level of between about 0.5 W and about 10 W. The pulse length is preferably about 30 ns, but can be any appropriate pulse length. The UV laser beam preferably has an energy per pulse of between about 50 µJ and about 1000 µJ.

The UV laser pulses may be converted to expanded collimated pulses by a variety of well-known optical devices, including beam expander or upcollimator lens components (with, for example, a 2× beam expansion factor), that are positioned along a laser beam path. A beam positioning system typically directs collimated pulses through a beam shaping objective lens to a desired laser target position on the ceramic substrate. The beam positioning systems incorporated in Model Series Nos. 43xx and 44xx small-area micromachining systems manufactured by Electro Scientific Industries, Inc., Portland, Oreg., the assignee of this patent application, are suitable for implementing the present invention to remove laser-ablative coatings on smaller (i.e., smaller than 10.2 cm×10.2 cm (4 in×4 in)) ceramic substrates. Some of these systems, which use an X-Y linear motor for moving the substrate and an X-Y stage for moving the beam shaping objective lens, are cost-effective positioning systems for making long, straight cuts. Gantry-type movable optics capable of greater X-Y travel ranges (i.e., 20.2 cm×20.2 cm (8 in×8 in) and 25.4 cm×25.4 cm (10 in×10 in)) are available to remove laser-ablative coatings from capacitor substrates. Skilled persons will appreciate that a system with a single X-Y stage for substrate positioning, with a fixed beam position and beam shaping optics, may alternatively be employed.

Figure 9:
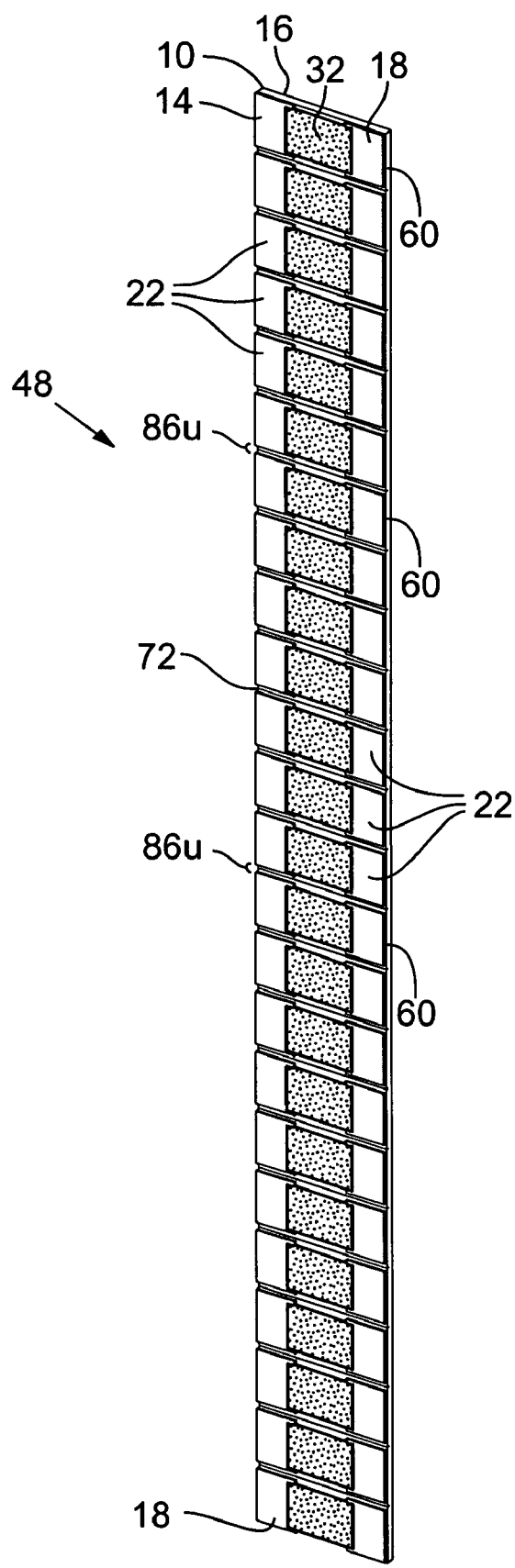
FIG. 9 is an isometric view of the resistive material-carrying upper major surface of a resistor rowbar formed by breaking the substrate plate of FIGS. 8A, 8B, and 8C.

Next, substrate plate 10 is broken into multiple rowbars 48, each of which includes side margins 60 along which run different spatially aligned pairs of first and second electrical conductor lines 18 and 20. Rowbars 48 are shown in FIG. 9. Exemplary rowbars 48 are used in forming type 0402 chip resistors.

Figure 10:
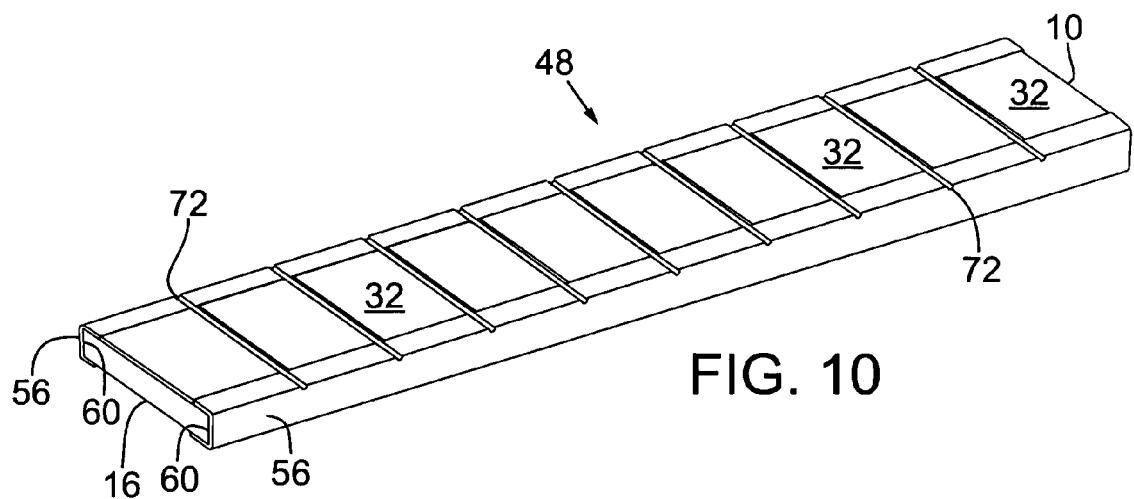
FIG. 10 is an isometric view of the rowbar of FIG. 9 having metallized side margins that form conductive interconnects between spatially aligned pairs of electrical conductor lines.

An electrically conductive material is applied to side margins 60 of rowbars 48 to form a conductive interconnect 56 between each of the electrical conductor lines 18 and 20 that comprise a spatially aligned pair. FIG. 10 is a diagram of rowbar 48 having side margins 60 that have been coated with an electrically conductive material to form conductive interconnects 56. The electrically conductive material is typically applied as a metallic paste to rowbar 48. The paste is preferably spread onto side margins 60 in a continuous layer of substantially uniform thickness, because voids in the paste could result in conductive interconnect discontinuities. Further, if the applied paste layer is too thick, the width of the resulting conductive interconnect 56 and its uniformity could be adversely affected. Exemplary methods of applying the metallic paste include metering, spreading, and sputtering. The paste may optionally be subsequently dried by heating or at ambient temperature to set conductive interconnects 56. Once laser-ablative coating 70 is in place, rowbars 48 can be completely covered with the electrically conductive material because laser-ablative coating 70 protects the entire rowbar 48 except for exposed electrical conductor lines 18 and 20 and their related side margins 60. Thus the electrically conductive coating covers only these areas and thereby forms conductive interconnects 56. Following application of the electrically conductive material and the formation of conductive interconnects 56, rowbar 48 is broken into multiple chip resistors 52.

Breakage of substrate 10 into multiple rowbars 48 may be effected in numerous ways. One exemplary preferred method entails forming scribe lines 72 (shown in FIGS. 7, 8A, 8B, and 8C) in substrate 10 by directing a UV laser beam along the lengths of streets 28u that extend along major surface 14 of substrate 10 and that are substantially parallel to electrical conductor lines 18. Substrate 10 absorbs at least a portion of the energy emitted by the laser beam, thereby effecting depthwise removal of a portion of substrate 10 to form shallow trenches along streets 28u created by patterns formed on substrate 10 by electrical conductor lines 18 and regions of resistive material 32. Upon application of a breakage force to substrate 10 on either side of each scribe line 72 of street 28u, substrate plate 10 breaks into separate rowbar pieces 48, each of which includes multiple chip resistors 52. Preferred lasers for use in forming scribe line 72 are the same as the lasers described above for use in effecting removal of laser-ablative coating 70 from electrical conductor lines 18, with the beam shaping objective lens removed to provide a beam of Gaussian shape. A preferred depth of the scribe line is about 10% of the depth of substrate 10, which for a 250 micron thick substrate is 25 microns.

Breakage of rowbars 48 into multiple, discrete chip resistors 52 entails forming scribe lines 72 in substrate 10 by directing a UV laser beam along the lengths of streets 86u that extend along major surface 14 of substrate 10 and that are substantially perpendicular to electrical conductor lines 18. Each scribe line 72 on a street 86u is preferably formed as described above. Upon application of a breakage force to rowbar 48 on either side of scribe line 72, rowbar 48 breaks into multiple, separate chip resistors 52.

In a preferred embodiment, scribe lines 72 on streets 28u that are used to break substrate 10 into rowbars 48 and streets 86u that are used to break the rowbars 48 into multiple, separate chip resistors 52 are formed in substrate 10 as follows. The chip resistors formed in accordance with the preferred methods are similar in appearance and are, therefore, identified by the same reference numeral as chip resistors 52 formed in accordance with prior art methods. A preferred scribing procedure entails first forming scribe lines 72 along streets 86u (i.e., X-direction), coating substrate 10 with laser-ablative coating 70, forming scribe lines 72 along streets 28u (i.e., Y-direction), and removing laser-ablative coating 70 from electrode pads 22 to form spaces 26. A Gaussian-shaped laser beam is used to form scribe lines 70, and a uniform laser beam is used to remove laser-ablative coating 70 from electrode pads 22. Removal of the remaining laser-ablative coating 70 is performed sometime later in the chip resistor fabrication process. One advantage of this scribing procedure is that it minimizes the handling of rowbars 48 following application of the laser-ablative coating.

In a further preferred embodiment, the scribe lines 72 formed along streets 28u and used to break the substrate 10 into rowbars 48 are deeper than the scribe lines 72 formed along streets 86u and used to singulate rowbar 48 into multiple, separate chip resistors 52. The depths of scribe lines 72 on streets 86u depends on whether a metal layer, e.g., an electrical conductor line, is present on lower major surface 16 with no scribe line. The depth of a scribe line 72 may be about 5%-8% of the substrate thickness in absence of a metal layer and equal to or greater than 10% in the presence of a metal layer.

The method of the present invention preferably further entails removing residual laser-ablative coating 70 from chip resistors 52 having conductive interconnects 56. While removal of residual laser-ablative coating 70 may be effected by various methods, the chosen method must be compatible with the resistive material used. One exemplary removal method entails firing chip resistors 52 in an oven. Another exemplary method entails using a water-soluble laser-ablative coating that may be removed by washing with water or another solvent. This process may be accompanied by abrasive action. Alternatively, residual laser-ablative coating 70 could remain in place.

Figure 11:
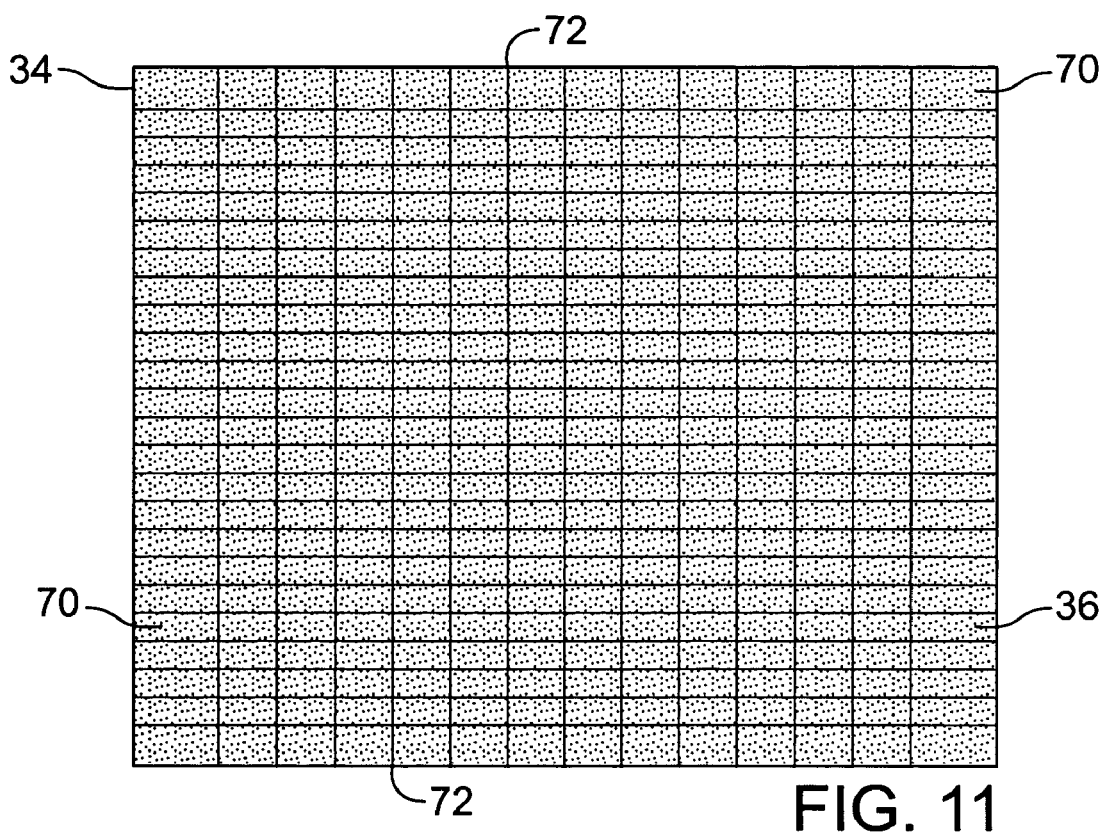
FIG. 11 is a plan view of a prescribed substrate plate of the type shown in FIG. 2 in which one of the major surfaces is coated with a laser-ablative coating.

With respect to the formation of discrete capacitors 54, a preferred method of the present invention entails applying laser-ablative coating 70 to both of prescribed first and second major surfaces 36 and 38 of substrate 34, as shown in FIG. 11 for major surface 36. As stated above, substrate 34 includes a dielectric material and is preferably formed of multiple layers of ceramic material. The ceramic material is prescribed before the firing operation because the ablation threshold of soft ceramic material is lower.

Figure 12:
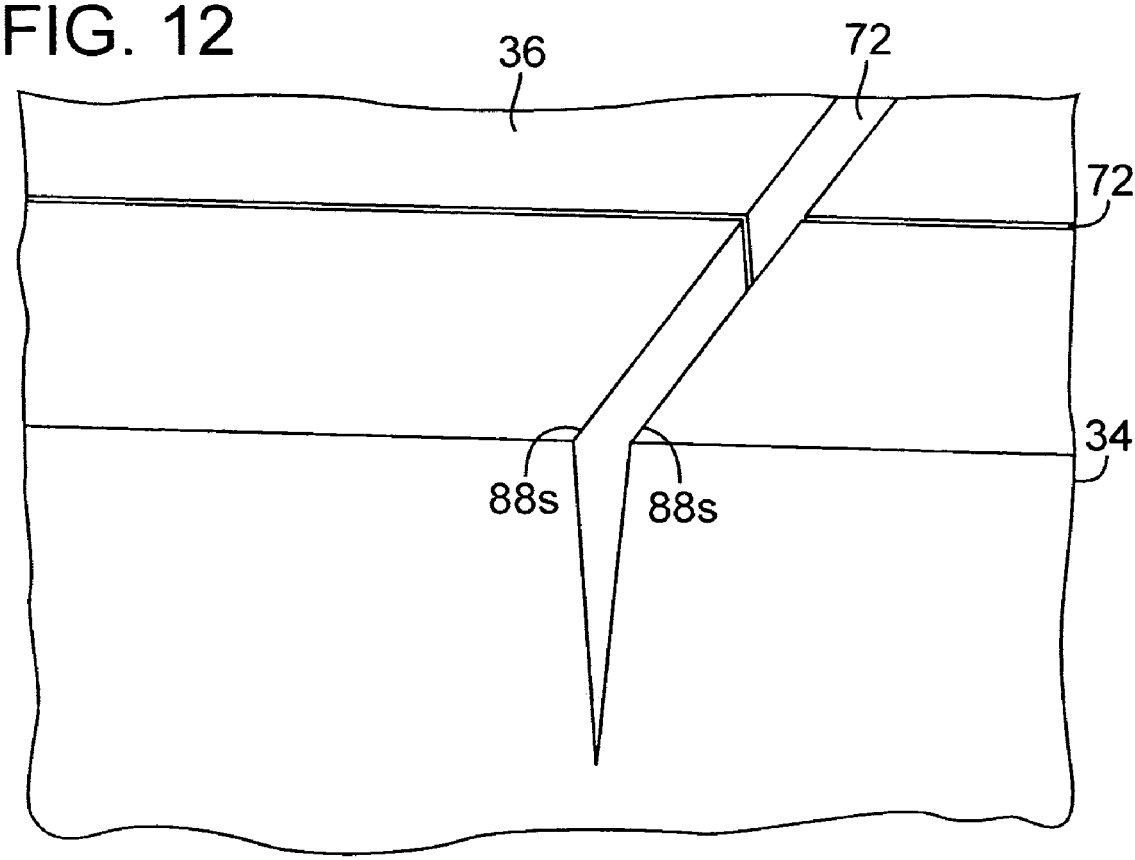
FIG. 12 is a greatly enlarged fragmentary isometric view of a scribe line formed in a substrate and exhibiting sharp edges at one of its major surfaces.
Figure 13A:
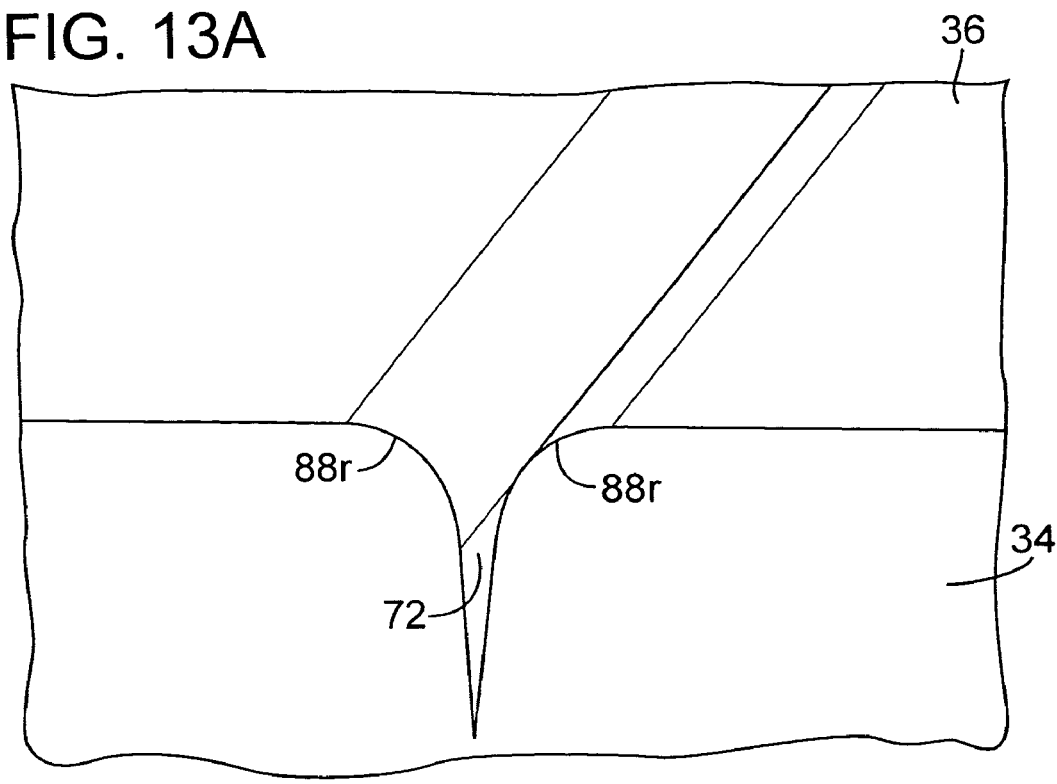
FIGS. 13A and 13B are greatly enlarged fragmentary isometric views showing a scribe line having at a major surface rounded edges without and with, respectively, superimposed dashed lines indicating the sharp edges shown in FIG. 12.
Figure 13B:
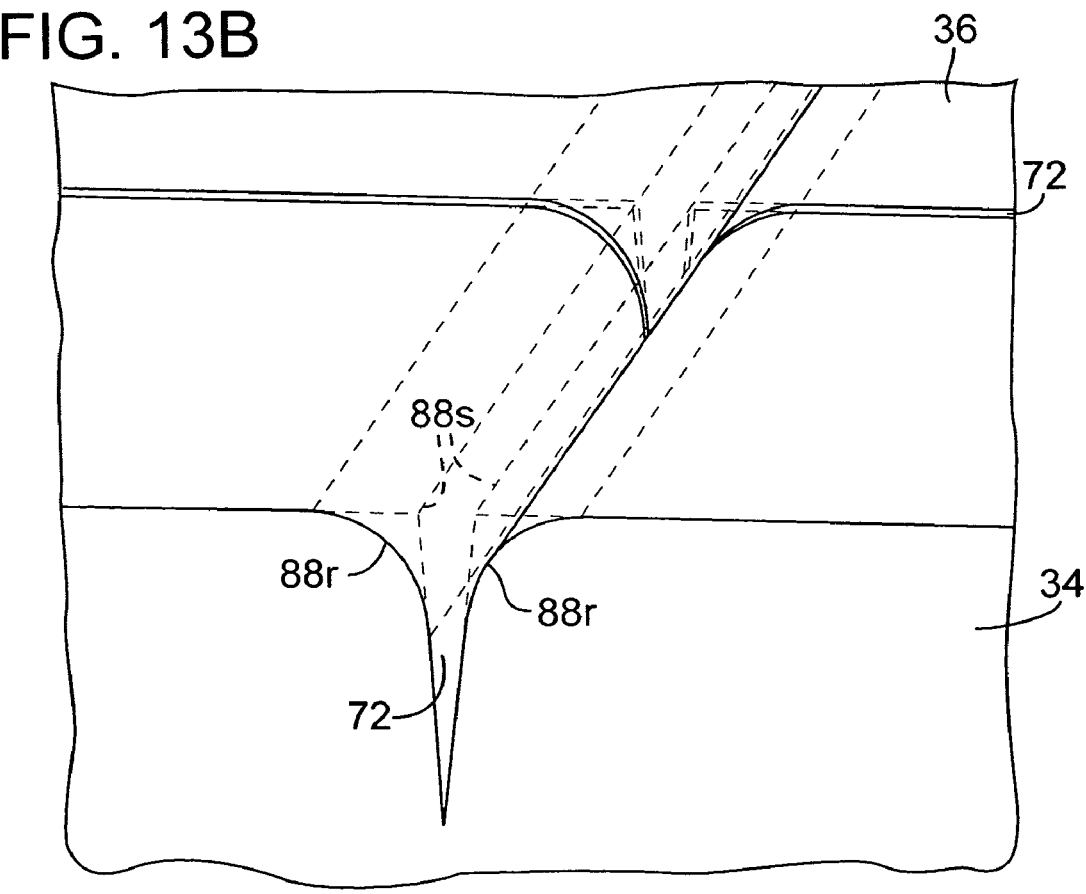

There are sharp edges present at major surfaces 36 and 38 where scribe lines 72 are formed. FIG. 12 is a greatly enlarged fragmentary isometric view of a scribe line 72 formed in substrate 34 and exhibiting sharp edges 88s at major surface 36. Such sharp edges 88s are rounded in the fabrication of capacitors. Rounding edges 88s is accomplished by passing a shaped beam along each of them to form a rounded edge 88r of a desired shape, as shown in FIG. 13A. Preferred beam spot sizes range from a 50 µm diameter, round spatially uniform beam to a 10 µm square spatially uniform beam. Preferred lasers for use in forming rounded edges 88r are the same as, and operate at generally the same output powers as those of, the laser described above for use in effecting removal laser-ablative coating 70. FIG. 13B shows formed in substrate 34 a scribe line 72 with sharp edges 88s depicted in dashed lines superimposed on rounded edges 88r to illustrate the effect of passing a shaped laser beam to round each sharp edge 88s. Skilled persons will appreciate that a laser output of sufficient power can effect edge rounding, albeit with reduced rounded edge shape control, in one pass along both of sharp edges 88s of scribe line 72.

Laser-ablative coating 70 is applied after the firing process, which would eliminate coating 70 if it were present. Both of major surfaces 36 and 38 are prescribed to facilitate breakage of the relatively thick dielectric substrate 34. Alternatively, all process steps can be done before firing, including adding the termination metal and firing the complete structure in one operation.

Figure 14:
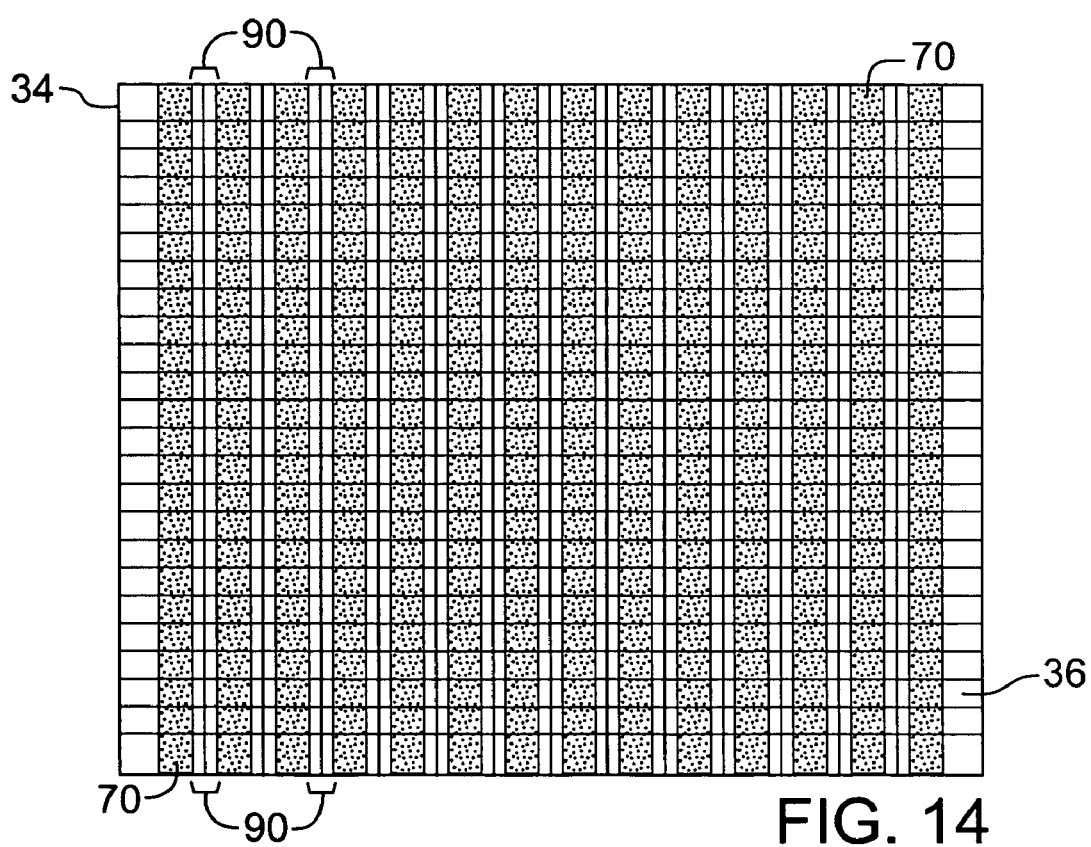
FIG. 14 is a plan view of the major surface of the substrate plate shown in FIG. 11 after a UV laser removed stripes of laser-ablative coating material.

As is described above with reference to resistors, a UV laser beam having a spot size and an energy distribution sufficient to remove the laser-ablative coating from selected regions of first and second major surfaces 36 and 38 is then aligned and directed for incidence on substrate 34. The UV laser beam is directed to remove amounts of laser-ablative coating 70 from first and second major surfaces 36 and 38 to expose stripes 90 of dielectric material where electrically conductive regions are to be formed, as is shown in FIG. 14. One of the major advantages of the laser process is its ability to compensate for shrinkage and warpage and thereby permit laser ablation along nonorthogonal or not perfectly straight lines. The lasers used to remove laser-ablative coating 70 and the parameters at which these lasers are preferably operated are the same as those described above with respect to chip resistors.

Figure 15:
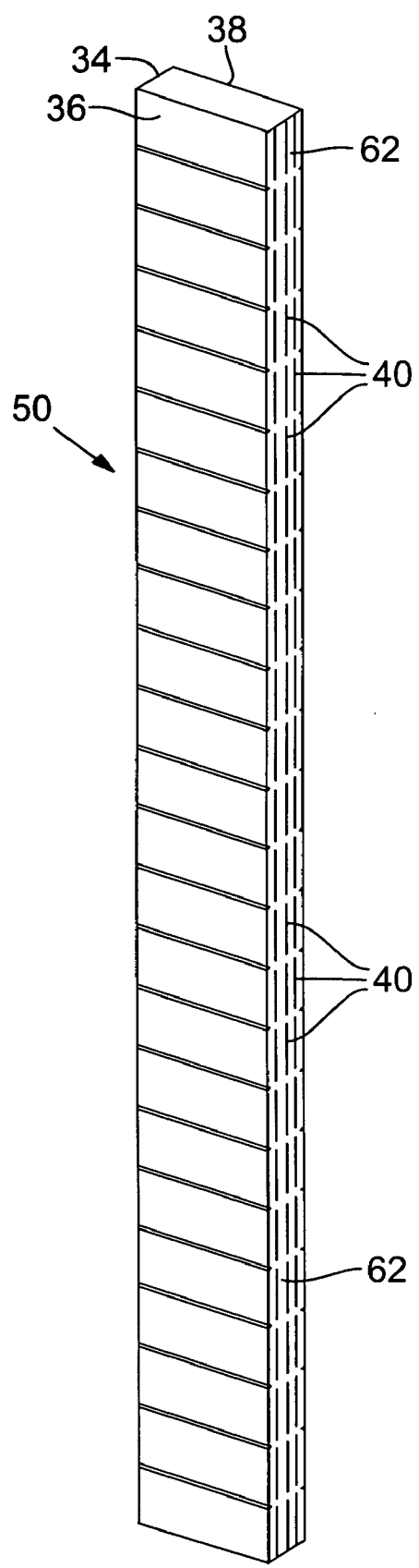
FIG. 15 is an isometric view of one of the major surfaces of a capacitor rowbar formed by breaking the substrate plate of FIG. 12.

As is described above with reference to resistors, substrate 34 is then broken into multiple rowbars 50, each of which includes side margins 62. Rowbars 50 are shown in FIG. 15. Breakage of substrate 34 into multiple rowbars 50 may be effected in any of the ways described above with respect to chip resistors.

Figure 16:
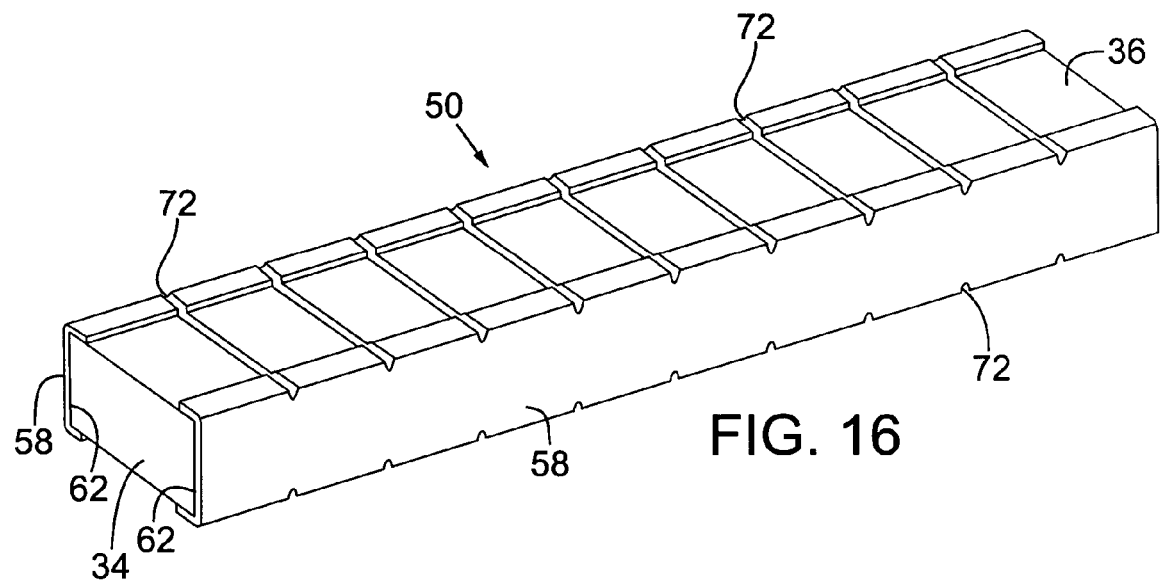
FIG. 16 is an isometric view of the rowbar of FIG. 14 having metallized side margins that form conductive interconnects of the interior electrodes and between the major surfaces.

Next, the electrically conductive material is applied to bridge across side margins 62 of rowbars 50 to form a conductive interconnect 58 for internal electrodes 40 and bond to the exposed stripes 90 of dielectric material on major surfaces 36 and 38. FIG. 16 is a diagram of rowbar 50 including side margins 62 that have been coated with an electrically conductive material to form conductive interconnects 58 over the previously exposed stripes 90. The electrically conductive material is preferably applied to rowbars 50 as is described above with reference to resistors.

Following application of the electrically conductive material and the formation of conductive interconnects 58 and electrical conductor lines, rowbar 50 is broken into multiple, discrete capacitors 54. Breakage of rowbars 50 into multiple, discrete capacitors 54 may be effected in any of the numerous ways described above with reference to chip resistors.

As indicated above for capacitors 54, certain types of substrates do not carry electrical conductor lines and, therefore, present vacant major surfaces. Practice of the preferred methods on such types of substrates can be accomplished by forming electrical conductor lines during formation of conductive interconnects. A laser-ablative coating is applied to a major surface, and the UV laser beam removes the laser-ablative coating to expose the vacant locations where electrical conductor lines would have been present to form the spatially aligned pairs of upper and lower electrical conductors. After breaking apart the substrate to form rowbars, the electrically conductive coating material covers the exposed vacant locations to form electrical conductor lines and wraps around the side margins to form conductive interconnects with the electrical conductor lines.

Figure 17:
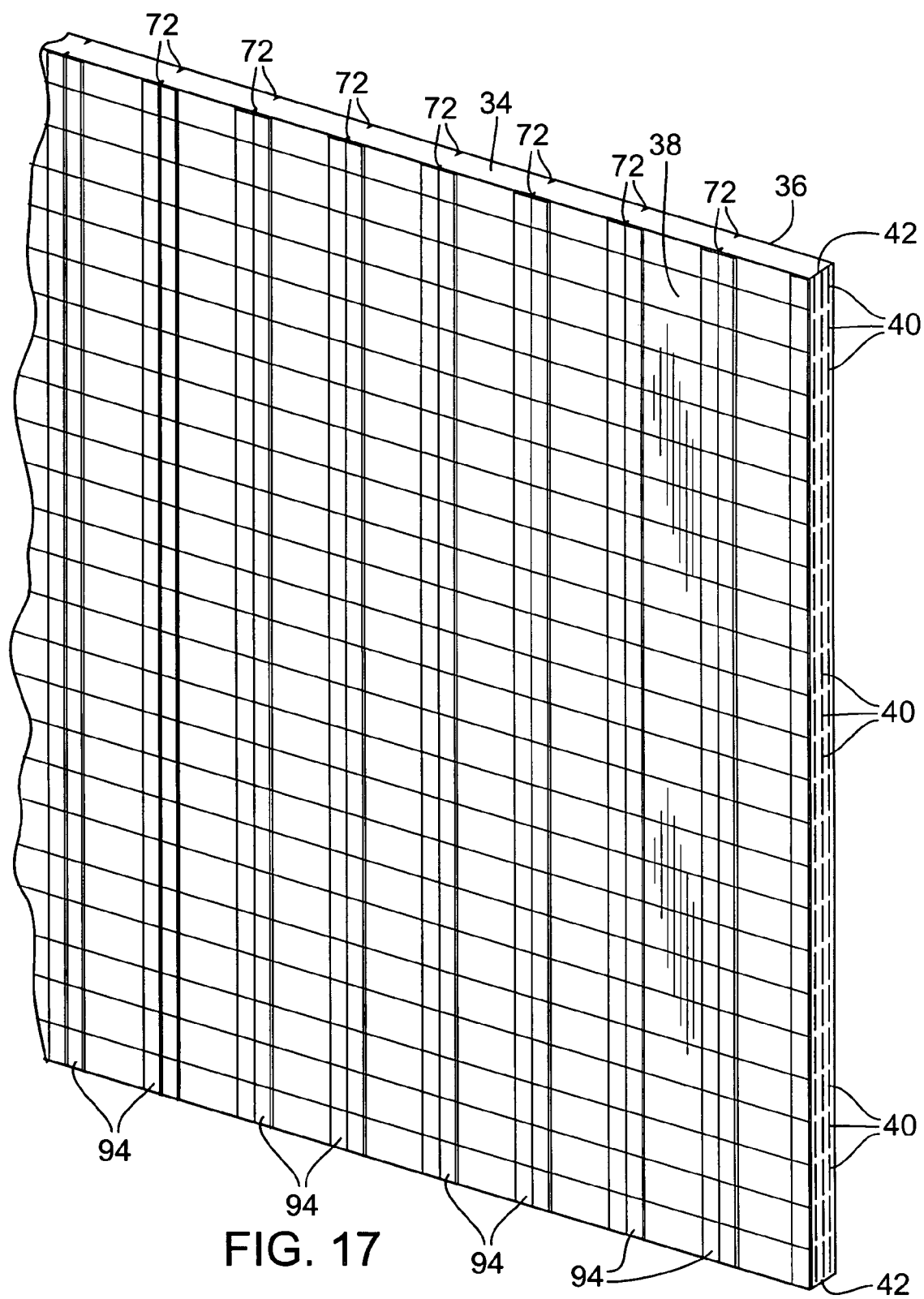
FIG. 17 is a fragmentary isometric view of a substrate in the form of a stack of multiple spaced-apart sheet electrodes, in which substrate has upper and lower major surfaces supporting, respectively, no conductor lines and multiple spaced-apart continuous conductor lines.
Figure 18:
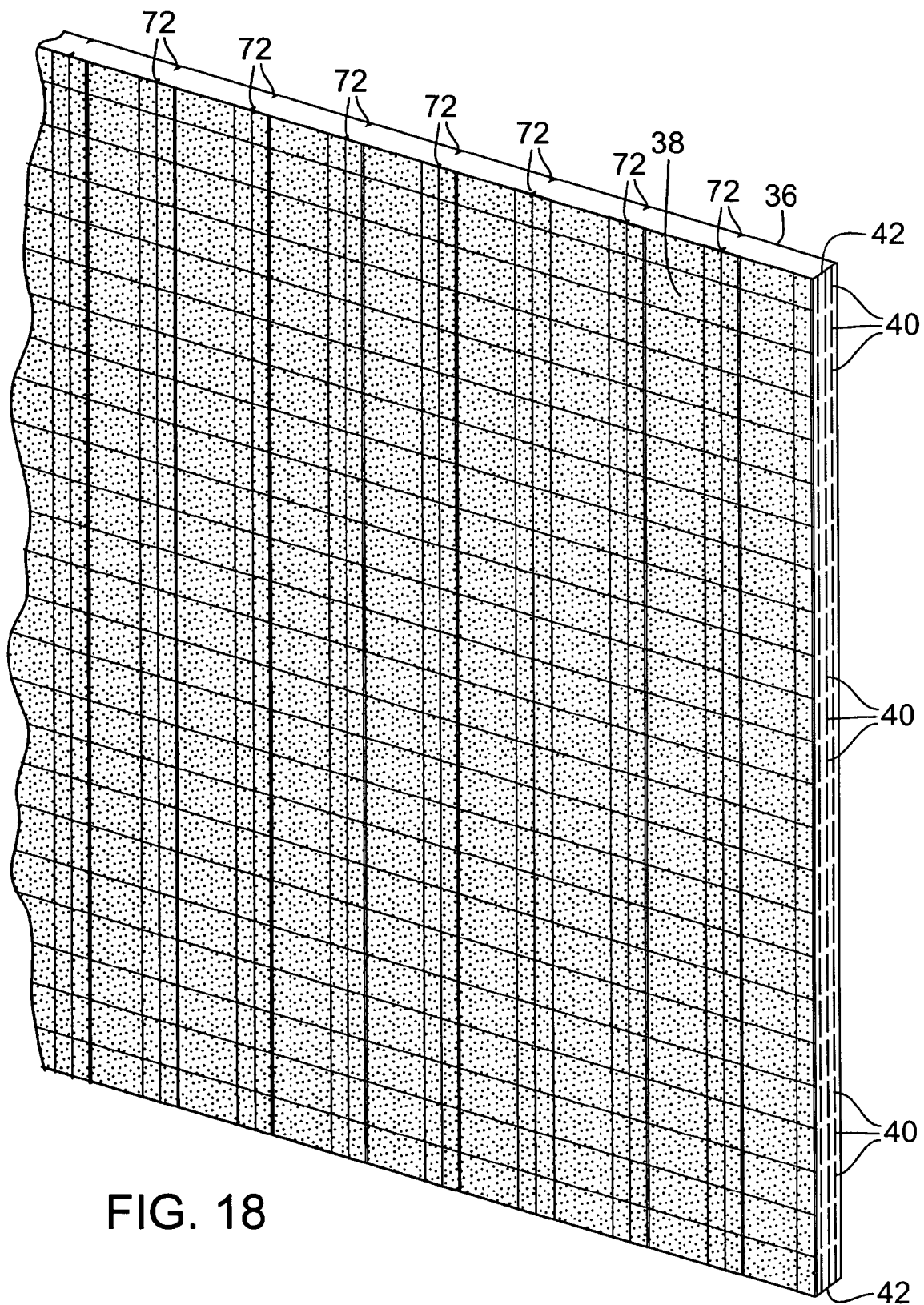
FIG. 18 shows the substrate of FIG. 17 with the lower major surface covered by a laser-removable coating.
Figure 19:
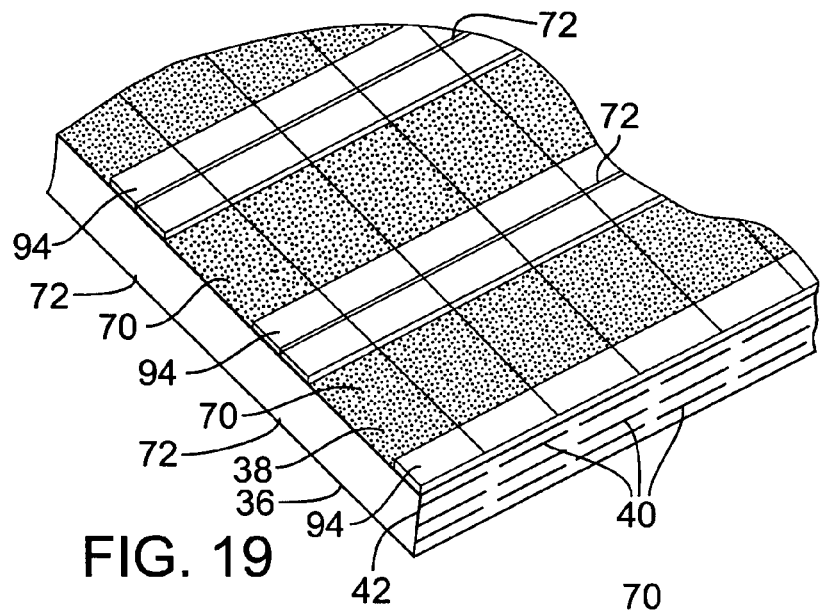
FIG. 19 is a fragmentary isometric view of the lower right-hand corner of the substrate of FIG. 18 showing the conductor lines exposed after a laser removed the laser-removable coating from them.

Certain capacitors have spaced-apart electrical conductors formed on the substrate surface that is placed adjacent a circuit board to ensure secure mounting to it. FIG. 17 shows a substrate of dielectric material 34 having an upper major surface 36 on which there are no conductor lines and a lower major surface 38 on which there are spaced-apart, continuous conductor lines 94. Except for the conductor lines 94 located at exposed side margins 42 of substrate 34, conductor lines 94 are preferably prescribed as shown. Upper major surface 36 is also preferably prepared with scribe lines. When U-shaped conductive interconnect 58 (FIG. 21) is to be formed, upper major surface 36 is prepared by application of laser-ablative coating 70, as described with reference to and shown in FIG. 11, and by removal of laser-ablative coating 70 with use of laser energy to expose narrow stripes 90, generally as described with reference to and shown in FIG. 12. When a J-shaped conductive interconnect 96 (FIGS. 23 and 24) is to be formed, there is no laser-ablative coating applied to upper major surface 36. Lower major surface 38 is prepared by application of laser-ablative coating 70 to the entire surface, as shown in FIG. 18, and by removal of laser-ablative coating 70 with use of laser energy to expose conductor lines 94, as shown in FIG. 19.

Electrically conductive interconnects are formed between conductor lines 94 and exposed side margins 42 of internal electrodes 40 in accordance with either one of two methods.

Figure 20:
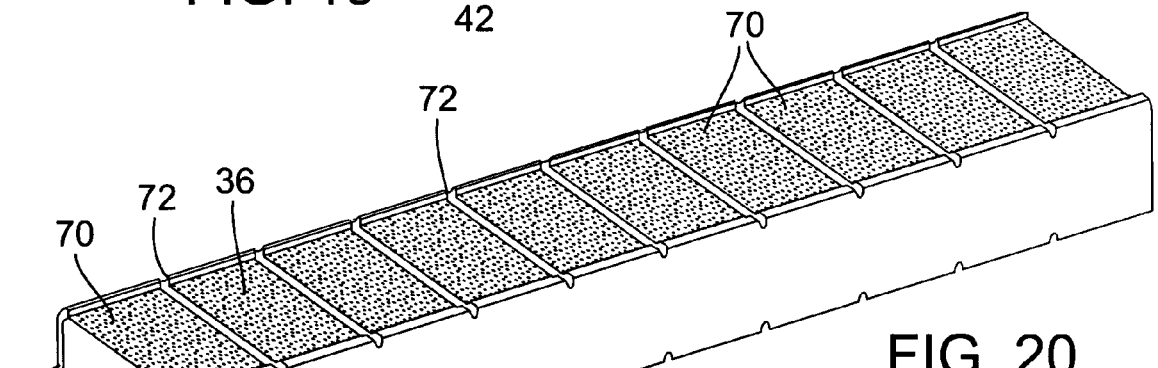
FIG. 20 is an isometric view of a capacitor rowbar formed by breaking the substrate of FIG. 19 and having J-shaped interconnects that bridge the side margins of the internal sheet electrodes and the electrical conductor lines.
Figure 21:
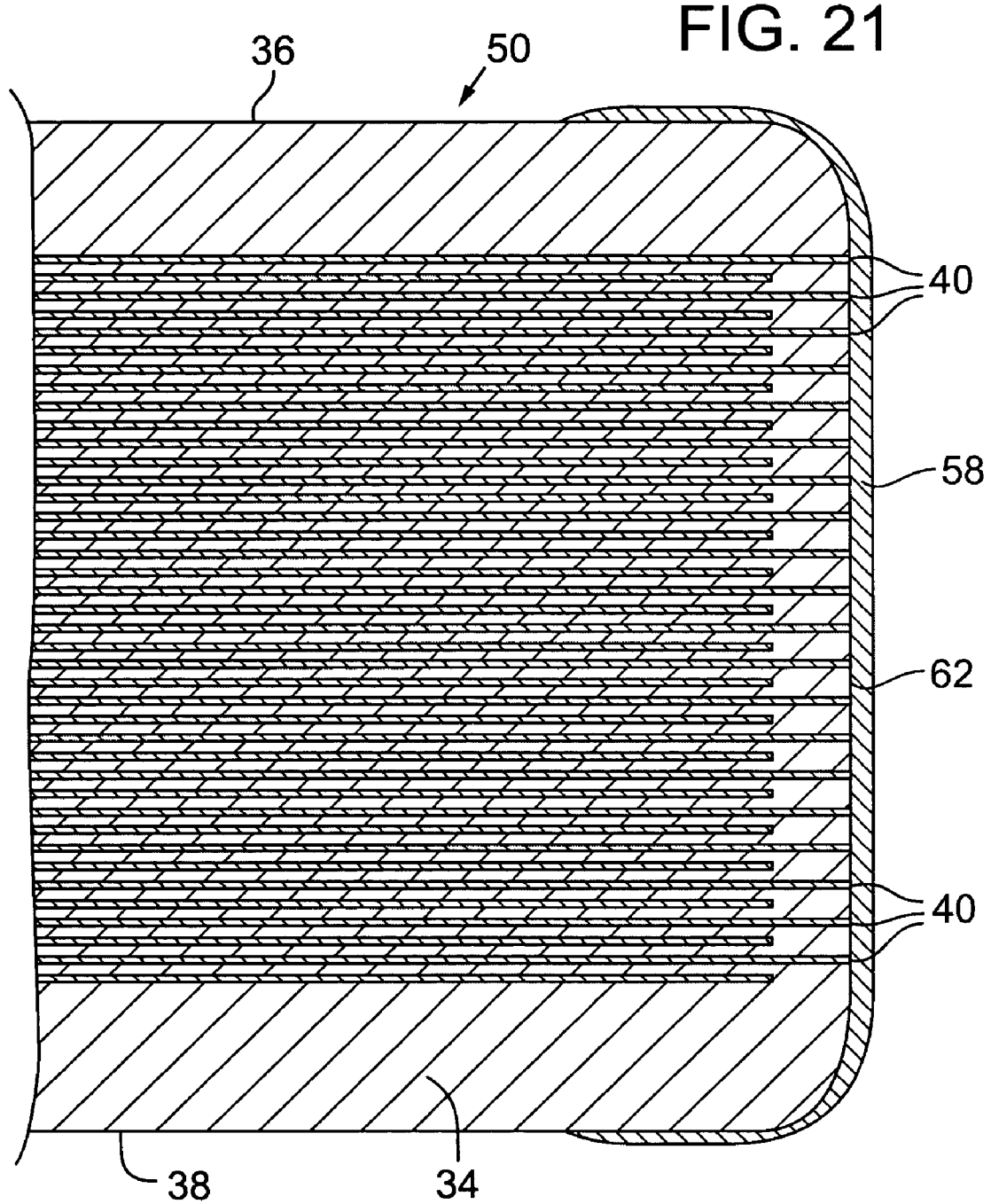
FIG. 21 is an enlarged fragmentary cross-sectional view of a rowbar having a U-shaped electrical interconnect formed by dip coating of conductive paste.

The first method entails breaking apart substrate 34 into rowbars and thereafter dip coating them in electrically conductive paste as described above to wrap around the side margins of substrate 34 and form conductive interconnects 96 that bridge side margins 42 of internal electrodes 40 and electrical conductor lines 94 as shown in FIG. 20 for rowbar 98. The extent of coverage of upper surface 36 by conductive interconnects 58 or 96 depends on the component dip angle. FIG. 20 shows a J-shaped conductive interconnect 96 formed by dipping rowbar 98 with its side margin 42 positioned at an acute angle relative to the surface of the coating material. The dip coating method is also carried out in forming conductive interconnects 58 of rowbars 50. FIG. 21 shows in cross-section for rowbar 50 a U-shaped conductive interconnect 58 formed after dipping rowbar 50 with its side margin 62 positioned parallel to the surface of the coating material. A U-shaped conductive interconnect 98 can be similarly formed for rowbar 98. A vapor deposition process may also be carried out as an alternative to dip coating in forming conductive interconnects 58 or 96.

Figure 22:
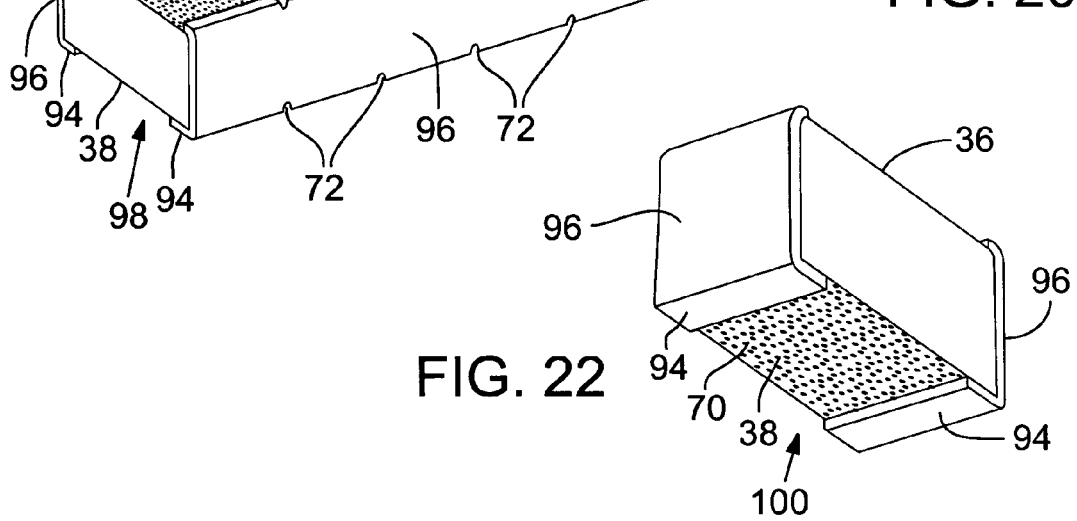
FIG. 22 is an isometric view of an individual capacitor formed by singulating the substrate of FIG. 19 and having J-shaped interconnects that bridge the side margins of the internal sheet electrodes and the electrical conductor lines.

The second method entails breaking apart substrate 34 along scribe lines 72 to singulate the individual capacitors and thereafter electroplating them to wrap around the side margins of substrate 34 and form generally J-shaped conductive interconnects 96, as shown in FIG. 22 for a capacitor 100. Each singulated capacitor 100 has rounded edges 88r at lower surface 38 and upper surface 36. Rounded edges 88r expose along side margins 42 a sufficient number of internal short length anchor tabs to which the electroplated coating can be bonded, thereby obviating a need for initially applying and subsequently removing a laser-ablative coating on upper major surface 36.

Figure 23:
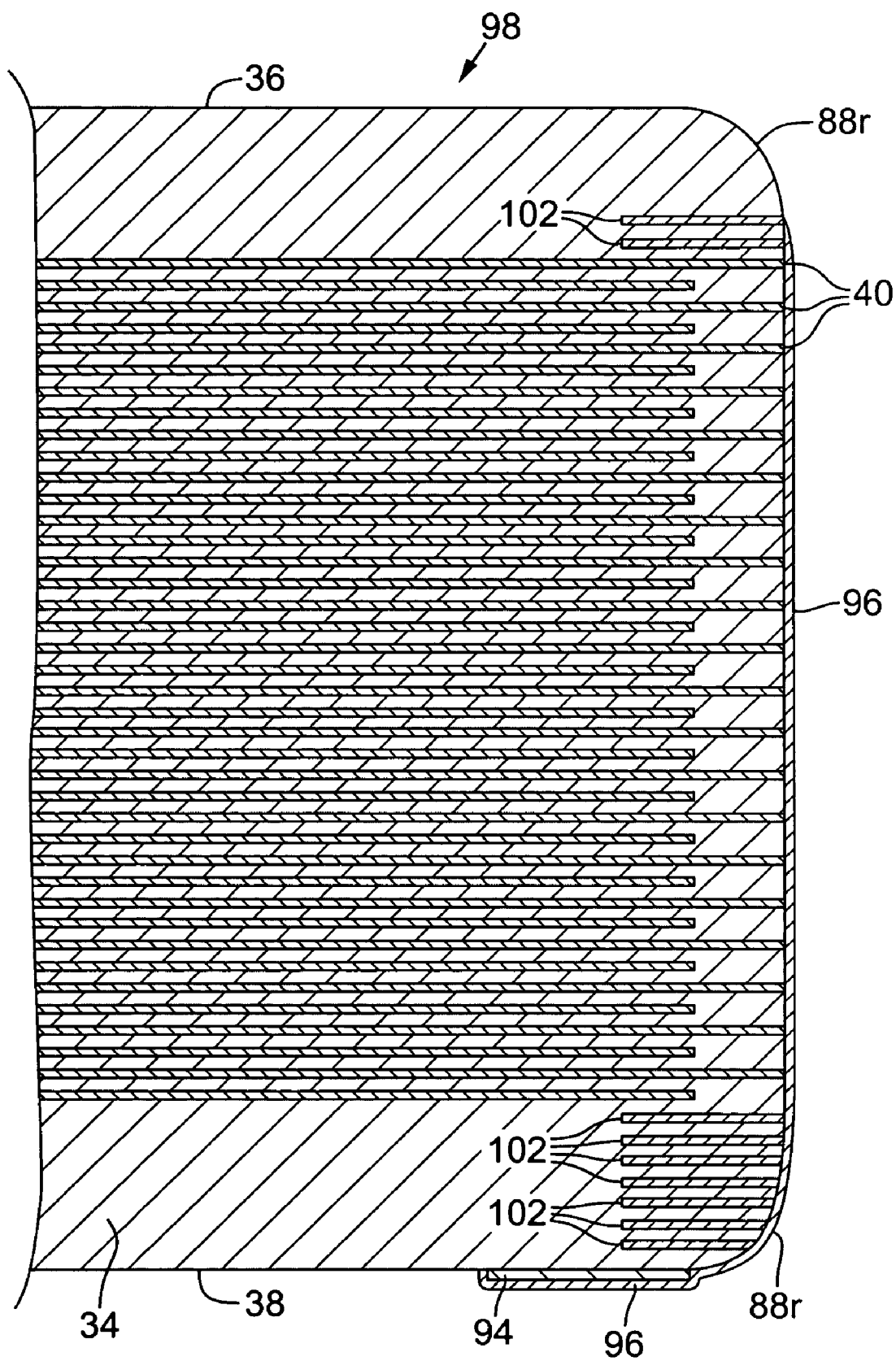
FIGS. 23 and 24 are enlarged side elevation and isometric, respectively, cross-sectional views of a surface-mount capacitor terminated post-singulation by an electroplating process.
Figure 24:
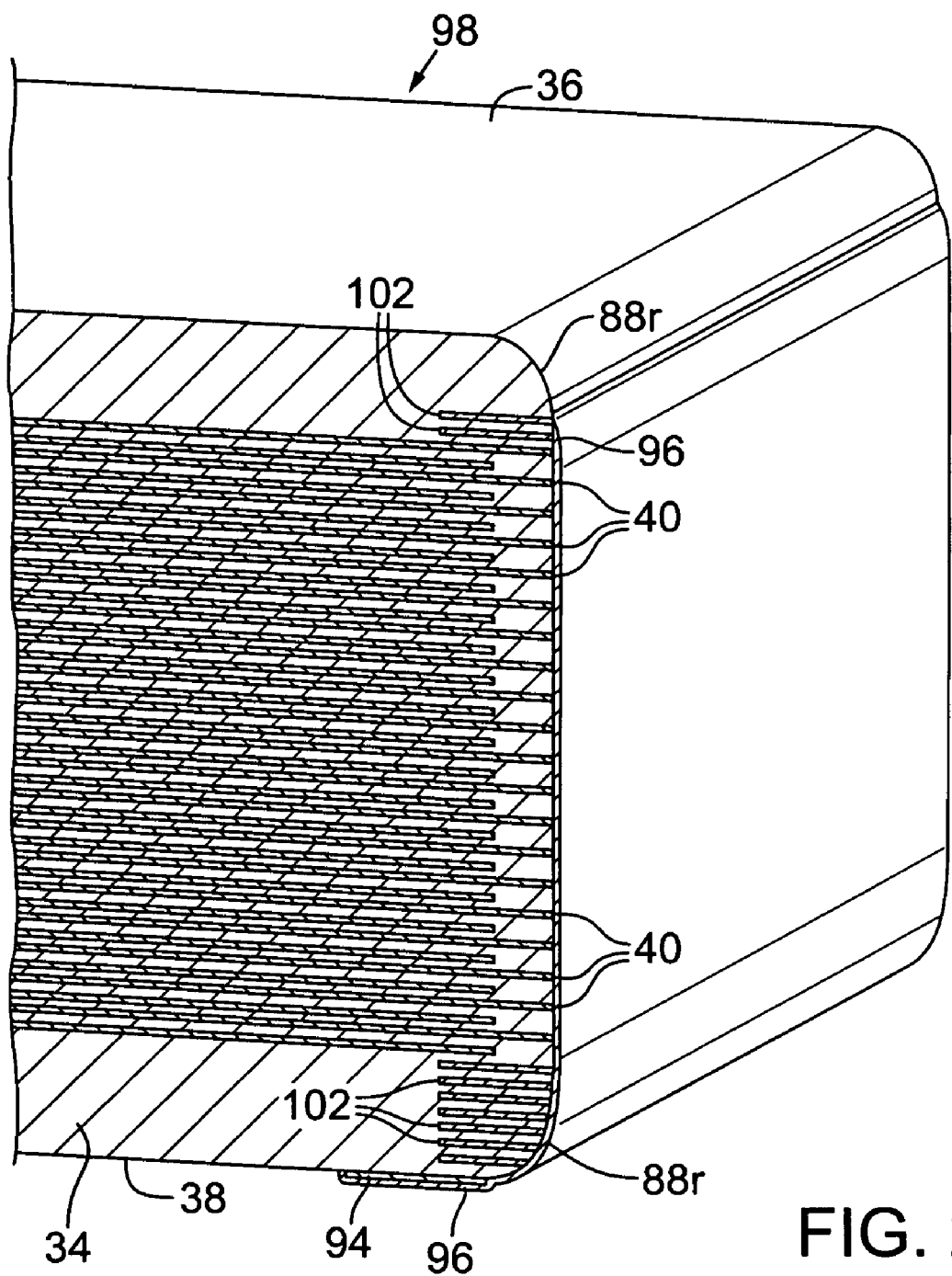

FIGS. 23 and 24 are enlarged fragmentary cross-sectional views of capacitor 100 having J-shaped conductive interconnect 96 formed by electroplating. The electroplated coating covers electrical conductor line 94 and internal anchor tabs 102 exposed at rounded edge 88r near lower major surface 38 and internal anchor tabs 102 exposed at rounded edge 88r near upper major surface 36. Conductive interconnect 96 formed as an electroplated coating does not extend beyond the uppermost exposed internal anchor tab 102 and, therefore, does not reach upper major surface 36.

The remaining laser-ablative coating may be removed by firing a green ceramic capacitor or by placement of a fired ceramic capacitor in a conventional nonacidic aqueous solution suitable for resistive material removal.

The techniques described above can similarly be applied in the fabrication of other miniature electronic components, such as inductors and varistors.

One advantage of the present invention is that effecting removal of the laser-ablative coating while the substrate is in plate form facilitates maintenance of the alignment of the laser beam and the substrate. Alignment is effected by aligning the laser beam with a datum point. Thus alignment may be accomplished in various ways, including plate alignment and pattern alignment. An example of pattern alignment entails aligning the laser beam with one or both of the electrical conductor lines or with a scribe line. One advantage of implementing pattern alignment is that it minimizes or eliminates the need for the pattern to be accurately aligned with the substrate. An example of plate alignment entails aligning the laser beam with the ceramic plate itself or some portion thereof, such as its corners or alignment holes that have been drilled into the plate. By effecting the laser-ablative coating removal when the substrate is in plate form, alignment of the first and second opposed major surfaces may be maintained. This facilitates increased precision and cleaner rowbar side margins.

Another advantage of the present invention is that it creates a very accurate "wraparound" termination stripe on the chip resistor or capacitor. In the case of chip resistors, it creates a very straight line from the electrical conductor lines to the edge of the region of resistive material.

It will be obvious to those having skill in the art that many changes may be made to the details of the above-described embodiments without departing from the underlying principles of the invention. The scope of the present invention should, therefore, be determined only by the following claims.

The invention claimed is:

1. A method of fabricating passive electronic components that are formed from a substrate having opposed first and second major surfaces and include electrically conductive interconnects, comprising:

applying laser-removable coatings to at least one of the opposed first and second major surfaces of the substrate;

directing for incidence on the substrate a laser beam having a spot size and an energy distribution sufficient to remove the laser-removable coating from multiple selected regions of at least one of the first and second major surfaces to which the laser-removable coating was applied;

aligning and imparting relative motion between the laser beam and each of the multiple selected regions to remove sufficient amounts of the laser-removable coatings to expose the multiple selected regions;

breaking the substrate to form multiple passive electronic components, each having side margins between the first and second major surfaces; and applying an electrically conductive material along the side margins of the passive electronic components to form electrically conductive interconnects between portions of the side margins spatially aligned with the multiple selected regions.

2. The method of claim 1, in which the substrate comprises multiple spaced-apart sheet electrodes stacked between the first and second major surfaces, the sheet electrodes having exposed portions at the side margins of the passive electronic components after the breaking of the substrate.

3. The method of claim 2, in which the multiple selected regions of at least one of the first and second major surfaces support electrical conductors.

4. The method of claim 3, in which the electrically conductive interconnects between the portions of the side margins spatially aligned with the multiple selected regions supporting electrical conductors are generally J-shaped.

5. The method of claim 4, in which there are anchor tabs exposed at the side margins of the passive electronic components, and in which the J-shaped electrically conductive interconnects are formed to follow rounded edges of the side margins and interconnect the anchor tabs exposed at the side margins of the passive electronic components.

6. The method of claim 3, in which the breaking of the substrate results in multiple singulated electronic components, and in which the applying of an electrically conductive material is performed on the singulated electronic components.

7. The method of claim 6, in which the applying of an electrically conductive material is accomplished by an electroplating process.

8. The method of claim 3, in which the substrate includes a ceramic material.

9. The method of claim 2, in which the breaking of the substrate into multiple passive electronic components is accomplished by providing the substrate with scribe lines formed along the lengths of the selected regions of at least one of the first and second major surfaces and applying a breakage force to the substrate to effect breakage of the substrate into separate pieces having side margins defined by the scribe lines.

10. The method of claim 9, in which the selected regions of at least one of the first and second major surfaces support electrical conductors, and in which the scribe lines are formed in the electrical conductors.

11. The method of claim 1, in which the selected regions of at least one of the first and second major surfaces support electrical conductors, and in which the breaking of the substrate forms multiple rowbars of the multiple passive electronic components.

12. The method of claim 11, in which the multiple selected regions of at least one of the first and second major surfaces support electrical conductors.

13. The method of claim 12, in which the electrically conductive interconnects between the portions of the side margins spatially aligned with the multiple selected regions supporting electrical conductors are generally J-shaped.

14. The method of claim 12, in which the applying of an electrically conductive material is accomplished by a dip coating process.

15. The method of claim 12, in which the applying of an electrically conductive material is accomplished by a vapor deposition process.

16. The method of claim 1, in which the multiple selected regions include regions of the first and second major surfaces.

17. The method of claim 16, in which none of the multiple selected regions of the first and second substrates supports an electrical conductor.

18. The method of claim 17, in which the electrically conductive interconnects between the portions of the side margins spatially aligned with the multiple selected regions are generally U-shaped and cover portions of the multiple selected regions.

* * * * *